(12) United States Patent
Ohashi et al.

(10) Patent No.: US 11,459,041 B2
(45) Date of Patent: Oct. 4, 2022

(54) SUCTION TRAVELING DEVICE

(71) Applicants: INDUSTRY NETWORK Co., Ltd., Nagano (JP); Nexco-East Engineering Company Limited, Tokyo (JP)

(72) Inventors: Toshio Ohashi, Nagano (JP); Takuya Akagi, Tokyo (JP); Yuichi Takazakura, Tokyo (JP); Akira Okabe, Tokyo (JP)

(73) Assignees: INDUSTRY NETWORK CO., LTD., Nagano (JP); NEXCO-EAST ENGINEERING COMPANY LIMITED, Tokyo (JP)

( * ) Notice: Subject to any disclaimer, the term of this patent is extended or adjusted under 35 U.S.C. 154(b) by 551 days.

(21) Appl. No.: 16/476,265

(22) PCT Filed: Jan. 6, 2018

(86) PCT No.: PCT/JP2018/000132
§ 371 (c)(1),
(2) Date: Nov. 15, 2019

(87) PCT Pub. No.: WO2018/128194
PCT Pub. Date: Jul. 12, 2018

(65) Prior Publication Data
US 2020/0079447 A1 Mar. 12, 2020

(30) Foreign Application Priority Data
Jan. 7, 2017 (JP) .............................. JP2017-001487

(51) Int. Cl.
*B62D 55/265* (2006.01)
*B62D 55/24* (2006.01)
*B62D 57/024* (2006.01)

(52) U.S. Cl.
CPC ........... *B62D 55/265* (2013.01); *B62D 55/24* (2013.01); *B62D 57/024* (2013.01)

(58) Field of Classification Search
CPC ..... B62D 55/265; B62D 55/24; B62D 57/024
(Continued)

(56) References Cited

U.S. PATENT DOCUMENTS 4,664,212 A * 5/1987 Nagatsuka ........... B62D 55/265
180/119
4,699,252 A * 10/1987 Sing ........................ B60T 1/14
180/15

(Continued)

FOREIGN PATENT DOCUMENTS

| JP | H2-14982 A | | 1/1990 | |
| JP | 2-95989 | * | 2/1990 | ........... B62D 57/024 |

OTHER PUBLICATIONS

International Search Report in International Application No. PCT/JP2018/000132, dated Apr. 10, 2018.

*Primary Examiner* — Anne Marie M Boehler
(74) *Attorney, Agent, or Firm* — Hauptman Ham, LLP

(57) ABSTRACT

A suction traveling device includes: a main pressure reducing chamber, sub pressure reducing chambers communicating with the main pressure reducing chamber and disposed in drive parts, ventilation holes on a same side of the sub pressure reducing chamber as suction holes and communicating the sub pressure reducing chambers and suction holes, and an open/close unit for releasing the ventilation holes when a pressure in suction chambers formed by a wall surface and the suction holes is equal to a pressure in the sub pressure reducing chamber and for closing the ventilation holes when the pressure in the suction chambers is higher than in the sub pressure reducing chamber. When the ventilation hole is closed, a gap of a size preventing the pressure in the sub pressure reducing chamber from affecting the pressure in the other suction chamber is formed in the ventilation hole.

11 Claims, 13 Drawing Sheets

(58) Field of Classification Search
USPC .................................. 180/9.1, 9.32, 901, 164
See application file for complete search history.

(56) References Cited

U.S. PATENT DOCUMENTS

| | | | |
|---|---|---|---|
| 5,366,038 A * | 11/1994 | Hidetsugu | B62D 55/07 180/164 |
| 5,487,440 A * | 1/1996 | Seemann | B62D 55/265 180/164 |
| 6,971,141 B1 * | 12/2005 | Tak | B25J 5/005 15/340.1 |
| 2015/0114738 A1 * | 4/2015 | Saylor, Jr. | B62D 55/265 180/164 |
| 2015/0375814 A1 | 12/2015 | Xiao et al. | |
| 2016/0039483 A1 * | 2/2016 | Nielsen | B62D 55/075 180/164 |

* cited by examiner

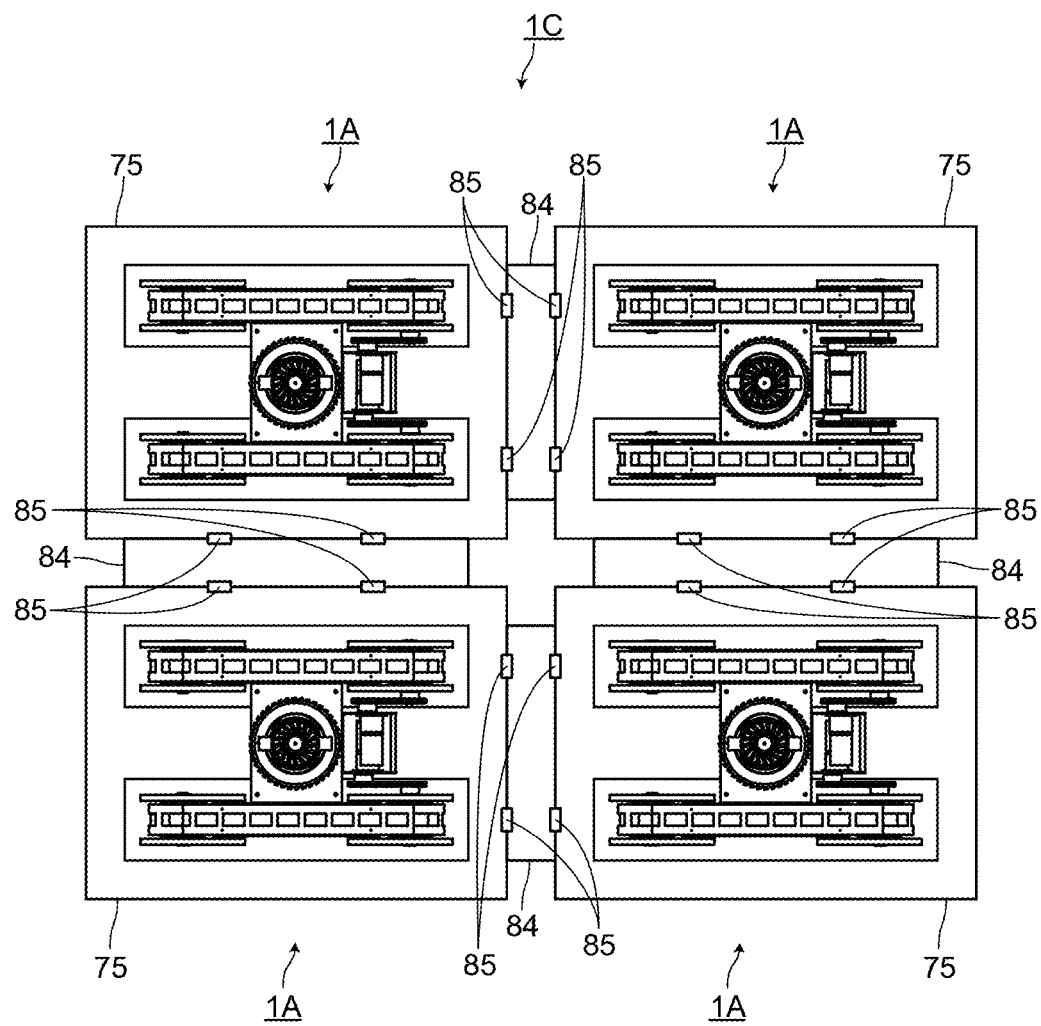
FIG.8
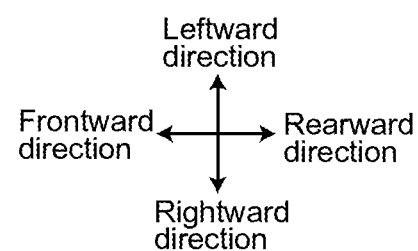

SUCTION TRAVELING DEVICE

RELATED APPLICATIONS

The present application is a National Phase of International Application Number PCT/JP2018/000132, filed Jan. 6, 2018, and claims priority to Japanese Application Number 2017-001487, filed Jan. 7, 2017.

TECHNICAL FIELD

The present invention relates to a suction traveling device.

BACKGROUND ART

There has been a demand for a self-propelled traveling device which can travel on a wall surface (including a glass surface) of a large structure for performing an operation such as maintenance and inspection, cleaning and the like of the wall surface. The large structure may be a wall of a building, an elevated portion of an expressway, or a bridge pier. As such a traveling device, there has been known a suction traveling device where a plurality of suction holes each having a suction opening are formed in an endless traveling belt (also referred to as a crawler) formed of a soft elastic body on a wall surface side partitioned by partitioning walls, and the traveling device is adhered by suction to the wall surface by sucking the wall surface through the suction holes by making use of a vacuum (see patent literature 1 and patent literature 2, for example).

CITATION LIST

Patent Literature

PTL 1: US patent laid-open publication No. 2015/0375814 specification
PTL 2: JP H02-14982 A

SUMMARY OF INVENTION

Technical Problem

A suction traveling device described in patent literature 1 is configured such that an open/close valve is disposed between a pressure reducing chamber and a suction chamber, the open/close valve is closed when a pressure in the suction chamber is equal to an atmospheric pressure, and the open/close valve is opened when a pressure in the pressure reducing chamber and a pressure in the suction chamber are equal. However, when the pressure in the suction chamber is higher than the pressure in the pressure reducing chamber, there is a concern that the open/close valve is not opened due to a pressure difference. In such a case, the open/close valve does not function thus giving rise to a drawback that a suction force is lowered.

In a suction traveling device described in patent literature 2, a vacuum suction is performed from suction holes formed on a wall surface side of an endless traveling belt through a ventilation hole and a pressure reducing chamber and hence, the suction traveling device can travel while adhering to a wall surface by suction. The suction hole is partitioned by a partition wall thus forming suction chambers. However, the endless traveling belt is a soft elastic body, and the partition wall is formed in a simple rectangular parallelepiped shape having a narrow width. Accordingly, the endless traveling belt has the structure which is easily deformable by buckling due to a strong suction force and hence, when the partition wall is deformed, a leakage of air occurs between the partition wall and a wall surface. As a result, there arises a drawback that the pressure reducing chamber becomes an atmospheric pressure (a positive pressure) thus remarkably lowering a suction force.

In the endless traveling belt described in patent literature 2, the soft elastic body is adhered to a timing belt in the form of a raw material. Accordingly, when a wall surface has a step or the like, the endless traveling belt cannot follow a shape of the step and hence, a gap is formed thus giving rise to a drawback that a suction force is lowered.

Further, with respect to the suction traveling devices described in patent literature 1 and patent literature 2, a plurality of suction traveling devices cannot be connected to each other in an advancing direction (longitudinal direction), or the plurality of suction traveling devices cannot be connected to each other in the direction orthogonal to the advancing direction (a lateral direction). Accordingly, the plurality of suction traveling devices cannot mutually complement their suction forces each other thus giving rise to a case where the suction traveling device cannot travel depending on a state of a wall surface. Further, there also exist drawbacks such as a drawback that conveyance (mounting) of a heavy object cannot be performed using one suction traveling device or a drawback that a long operation time is required when a wall surface having a large area is to be maintained and inspected.

In view of the above-mentioned circumstances, it is an object of the present invention to provide a suction traveling device which can overcome at least one drawback that the conventional suction traveling devices (including the suction traveling devices described in the above-mentioned patent literatures) have. For example, it is an object of the present invention to provide a suction traveling device which can maintain a stable suction force. It is another object of the present invention to provide a suction traveling device which can efficiently perform a wall surface operation even when a wall surface is a wall surface having a large area or a ceiling. It is still another object of the present invention to provide a suction traveling device which can mount an operation device having a large weight on the suction traveling device.

[1] A suction traveling device according to the present invention is a suction traveling device capable of traveling on a traveling surface while adhering to the traveling surface by suction, the suction traveling device including:

a first drive part and a second drive part each having an endless traveling belt in which a plurality of suction holes are formed;

a main pressure reducing chamber where a pressure is reduced by an air suction device, and sub pressure reducing chambers each communicating with the main pressure reducing chamber and being disposed in the first drive part and the second drive part respectively;

a plurality of ventilation holes formed in the sub pressure reducing chamber, the plurality of ventilation holes being disposed on a side of the sub pressure reducing chamber where the suction holes are disposed, the plurality of ventilation holes being provided for making the sub pressure reducing chambers and the plurality of respective suction holes communicate with each other; and an open/close unit for releasing or closing the plurality of respective ventilation holes, wherein the open/close unit is configured to release the ventilation holes when a pressure in a plurality of suction chambers formed by the wall surface and the suction holes is equal to a pressure in the sub pressure reducing chamber, and is configured to close the ventilation holes when the pressure in the suction chambers is higher than the pressure in the sub pressure reducing chamber, and a gap having a size which prevents the pressure in the sub pressure reducing chamber from affecting the pressure in other suction chamber is formed in the ventilation hole when the ventilation hole is closed.

[2] In the suction traveling device according to the present invention, it is preferable that an opening area of the suction hole on a sub pressure reducing chamber side be smaller than an opening area of the suction hole on a wall surface side.

[3] In the suction traveling device according to the present invention, it is preferable that the suction traveling device further include a mounting member which is fixed to a bottom portion of the main pressure reducing chamber portion on a wall surface side, wherein a portion of the mounting member have a frame portion which is formed in a projecting manner, the frame portion being provided for mounting an operation device or the like outside the first drive part and the second drive part.

[4] In the suction traveling device according to the present invention, it is preferable that a plurality of suction traveling devices be connected to each other by the mounting member fixed to the main pressure reducing chamber and a connecting unit in a traveling direction and/or in a direction orthogonal to the traveling direction.

[5] In the suction traveling device according to the present invention, it is preferable that the connecting unit have: a connecting plate which is disposed between the mounting members disposed adjacently to each other; and a hinge which connects the mounting plates and the connecting plate to each other.

[6] A suction traveling device according to the present invention is a suction traveling device which includes: an endless traveling belt in which a plurality of suction holes are formed; and an air suction device for sucking air on a suction hole side, wherein the suction traveling device is configured to perform at least one of moving forward or moving backward due to rotation of the endless traveling belt in a state where a posture of the endless traveling belt is maintained while adhering to a traveling surface by suction, wherein the suction traveling device further comprises an open/close unit for transmitting a reduction of a pressure generated by the air suction device to the suction hole side or not for imparting the reduction of the pressure to the suction hole side, and the open/close unit is configured to reduce a pressure in the suction hole by opening in a state where the suction hole side does not communicate with an external space, and is configured to prevent a pressure on the suction hole side from not being reduced due to continuation of a closed state of the open/close unit when a non-communication state is restored by closing while forming a slight gap in a state where the suction hole side communicates with an external space and a pressure on the suction hole side is an atmospheric pressure.

[7] In the suction traveling device according to the present invention, it is preferable that the open/close unit be formed of: a valve element disposed on a body side which the endless traveling belt opposedly faces, and configured to release or close a plurality of respective ventilation holes disposed communicably with the suction hole disposed on the body side; and an elastic member configured to bias the valve element in a direction that the ventilation holes are released.

[8] In the suction traveling device according to the present invention, it is preferable that the endless traveling belt have a two layer structure formed of: a power transmission belt by which a traveling drive force is transmitted; and a traveling belt formed of a soft elastic body, and the traveling belt be fixedly mounted on the power transmission belt in a state where the traveling belt is compressed in a length direction.

[9] In the suction traveling device according to the present invention, it is preferable that the endless traveling belt further include a suction belt formed by laminating a belt-like member formed of a soft elastic body and a slide tape on a sub pressure reducing chamber side of the power transmission belt, the suction belt be fixed to a center portion of the endless traveling belt in a width direction, the suction belt having holes which are communicable with the ventilation holes and the suction holes, and the slide tape be disposed so as to slide while being in close contact with an outer shell surface of the sub pressure reducing chamber on a traveling surface side in a state where the suction traveling device travels on the traveling surface while adhering to the traveling surface by suction.

[10] In the suction traveling device according to the present invention, it is preferable that a plurality of rollers where a portion of an outer peripheral surface of each roller protrudes from the outer shell surface be arranged on the outer shell surface on both sides of the suction belt in a width direction such that the rollers sandwich the suction belt, and be disposed in a longitudinal direction of the outer shell surface, and the rollers be disposed so as to roll by the power transmission belt when the suction traveling device travels on the traveling surface while adhering to the traveling surface by suction.

BRIEF DESCRIPTION OF DRAWINGS

FIGS. 3A and 3B are cross-sectional views showing a part of the configuration of suction holes in cross section which the suction traveling device shown in FIG. 1 and FIG. 2 has in an enlarged manner, wherein FIG. 3A shows the configuration according to a technique which the inventors of the present invention have previously made, and FIG. 3B shows the configuration according to an embodiment of the present invention.

FIGS. 5A to 5C are explanatory views showing the configuration and the manner of operation of the endless traveling belt which the suction traveling device shown in FIG. 1 and FIG. 2 has, wherein FIG. 5A is a perspective view showing a method of manufacturing the endless traveling belt, FIG. 5B is a partial cross-sectional view showing a state where an endless traveling belt according to the technique which the inventors of the present invention have made previously travels on a wall surface having a stepped portion, and FIG. 5C is a partial cross-sectional view showing a state where an endless traveling belt according to the embodiment of the present invention travels on a wall surface having a stepped portion.

FIGS. 6A and 6B are views showing a suction traveling device according to a second embodiment of the present invention where a mounting frame is fixed to the suction traveling device, wherein FIG. 6A is a plan view as viewed from a wall surface side, and FIG. 6B is a front view as viewed from a front side.

FIGS. 7A and 7B are views showing a suction traveling device according to a third embodiment of the present invention, and also is a view showing an example where a plurality of suction traveling devices are connected to each other in a traveling direction (longitudinal direction), wherein FIG. 7A is a plan view as viewed from an upper side, and FIG. 7B is a side view as viewed from a left side in FIG. 7A.

FIG. 8 is a plan view showing an example where a plurality of suction traveling devices according to a fourth embodiment of the present invention are connected to each other in a traveling direction (longitudinal direction) and in a direction orthogonal to the traveling direction (lateral direction).

DESCRIPTION OF EMBODIMENTS

Hereinafter, a suction traveling device 1 according to an embodiment of the present invention is described with reference to FIG. 1 to FIG. 8. The suction traveling device 1 according to the present invention is a device capable of freely traveling on a wall surface which is a vertical or a steep inclined surface or the like by adhering to the wall surface by suction. For example, the suction traveling device 1 according to the present invention is a traveling device which can be suitably used in an operation such as maintenance, inspection or cleaning of a wall surface (including a glass surface) of a large structure such as a wall of a building, an elevated portion of an expressway, or a bridge pier.

First Embodiment

Figure 1:
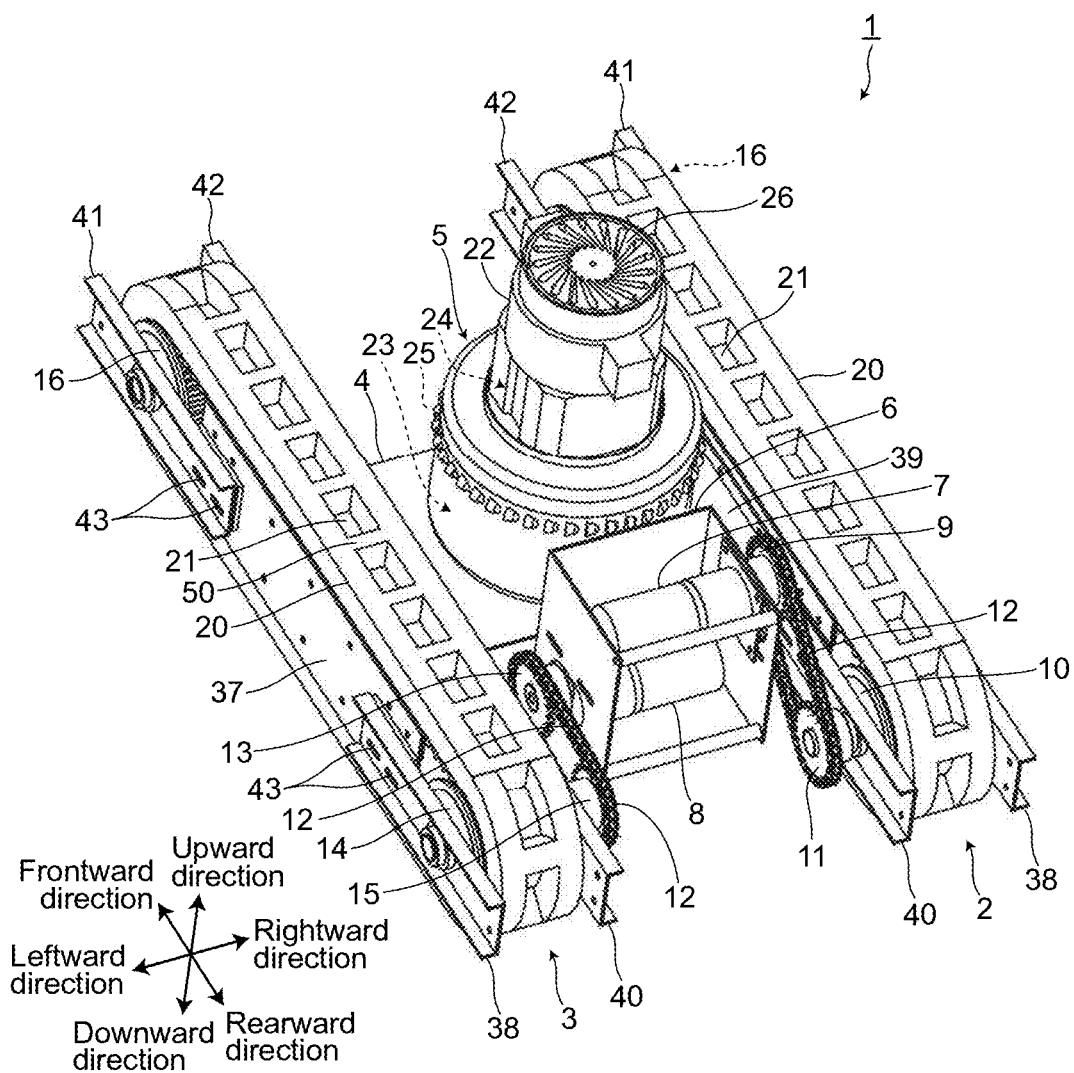
FIG. 1 is a perspective view of an external appearance showing a suction traveling device according to a first embodiment of the present invention.

FIG. 1 is a perspective view of an external appearance showing a suction traveling device 1 according to a first embodiment. With respect to the drawings used for the description made hereinafter, the description is made by setting a left side of FIG. 1 as "left side", a right side of FIG. 1 as "right side", a front side of a paper on which FIG. 1 is drawn as "upper side", and a side of the paper opposite to the front side of the paper as "lower side" or "wall surface side". Although the traveling direction of the suction traveling device 1 can be freely defined, in this embodiment, the description is made by setting a leftward and upward direction in the drawing as a frontward direction or a frontward moving direction, and a direction in the drawing opposite to the leftward and upward direction as a backward direction or a backward moving direction. As shown in FIG. 1, the suction traveling device 1 has a first drive part 2 and a second drive part 3 which are arranged on both left and right ends respectively. Although the first drive part 2 and the second drive part 3 have the same configuration, the first drive part 2 and the second drive part 3 are arranged in an opposedly facing manner with a pressure reducing chamber part 4 sandwiched therebetween.

A blower motor unit 5 which forms an air suction device is disposed on the pressure reducing chamber part 4. The blower motor unit 5 is disposed at a laterally intermediate position between the first drive part 2 and the second drive part 3, and is disposed at an approximately center portion of the whole suction traveling device 1. Further, the blower motor unit 5 is disposed at a center portion of the pressure reducing chamber part 4 in a horizontal direction in an upwardly raised manner. A gear box 6 is disposed on a rear side of the blower motor unit 5. In the gear box 6, a first motor 7 which imparts a rotation drive force to the first drive part 2 is disposed on an upper side, and the second motor 8 which imparts a rotation drive force to the second drive part 3 is disposed on a lower side. The first motor 7 and the second motor 8 are respectively formed of a so-called geared motor. The first motor 7 and the second motor 8 output power to the first drive part 2 and the second drive part 3 respectively with appropriate reduction of rotational speeds. The driving of the first motor 7 and the driving of the second motor 8 can be individually independently controlled. Accordingly, the suction traveling device 1 can move forward or backward, can turn a moving direction, or turn about its axis of rotation.

Figure 2:
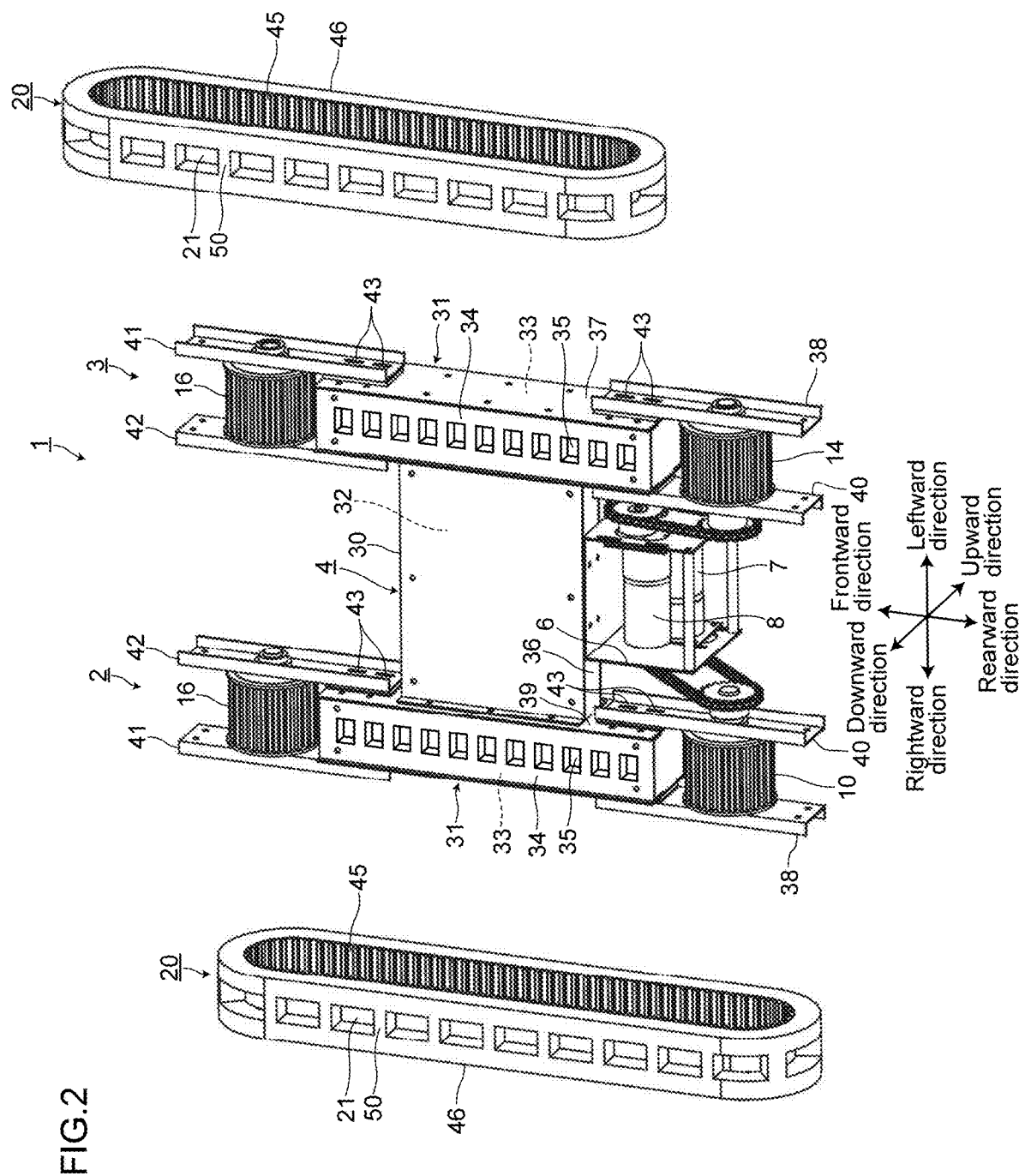
FIG. 2 is a perspective view of the suction traveling device according to the first embodiment of the present invention as viewed from a wall surface side, and is a view where an endless traveling belt is shown in a disassembled state.

A sprocket 9 is fixed to a shaft of the first motor 7, and a drive force is transmitted from the sprocket 9 to a sprocket 11 on a drive wheel 10 side by a chain 12. The sprocket 11 is fixed to a shaft of the drive wheel 10 and rotates the drive wheel 10. Also on a second drive part 3 side, the sprocket 13 is fixed to a shaft of the second motor 8, and a drive force is transmitted from the sprocket 13 to a sprocket 15 on a drive wheel 14 side by a chain 12. The sprocket 15 is fixed to a shaft of the drive wheel 14 and rotates the drive wheel 14. Driven wheels 16, 6 are disposed on a front side of the first drive part 2 and the second drive part 3 respectively. In FIG. 1, the illustration of the driven wheel 16 on a first drive part 2 side is omitted. However, the driven wheel 16 on the first drive part 2 side is shown in FIG. 2 described later. On respective outer peripheries of the drive wheels 10, 14 and the driven wheels 16, 16, protruding portions and recessed portions which extend laterally are alternately formed in a circumferential direction (such protruding portions and recessed portions being referred to as "teeth" hereinafter). On the first drive part 2 side, an endless traveling belt 20 extends between and is wound around the drive wheel 10 and the driven wheel 16. On a second drive part 3 side, the other endless traveling belt 20 extends between and is wound around the drive wheel 14 and the driven wheel 16. A plurality of suction holes 21 are disposed on the endless traveling belts 20, 20 in a longitudinal direction. The suction holes 21 are formed in the endless traveling belts 20, 20 at an equal interval over the entire periphery of the endless traveling belts 20, 20. The suction holes 21 have the same size, and penetrate the endless traveling belts 20, 20 in a thickness direction. The configuration of the suction hole 21 is described in a simplified manner in FIG. 1. The configuration of the suction hole 21 is described in detail with reference to FIGS. 3A, 3B, 4A and 4B.

The blower motor unit 5 incorporates a blower pump 23 which sucks air in the pressure reducing chamber part 4 into the blower case 22, and a blower motor 24 which rotates the blower pump 23. An air discharge port 25 through which air sucked from the pressure reducing chamber part 4 by the blower pump 23 is discharged to the outside is formed in a side surface of the blower case 22. A cooling fan 26 for the blower motor 24 is mounted on an upper end portion of the blower motor unit 5. The blower pump 23 has a well-known umbrella-type turbo fan, and is provided for reducing a pressure in the pressure reducing chamber part 4 by sucking air from the inside of the pressure reducing chamber part 4. The blower pump 23 and the blower motor 24 may be formed of a well-known blower pump and a well-known blower motor. A cooling fan may be mounted on the blower motor 24.

Next, the first drive part 2, the second drive part 3 and the endless traveling belt 20 are described with reference to FIG. 1 and FIG. 2.

FIG. 2 is a perspective view of the suction traveling device 1 as viewed from a wall surface side (lower side), and is a view where the endless traveling belt 20 is shown in a disassembled state. The pressure reducing chamber part 4 is developed in an approximately H shape. The pressure reducing chamber part 4 is formed of: a main pressure reducing chamber portion 30 which forms a center portion; and a pair of sub pressure reducing chamber portions 31 which is disposed on both left and right sides of the main pressure reducing chamber portion 30. With such a configuration, as shown in FIG. 2, the pressure reducing chamber part 4 is developed in an approximately H shape as a whole. Assume an internal space of the main pressure reducing chamber portion 30 as a main pressure reducing chamber 32, and assume an internal space of the sub pressure reducing chamber portion 30 as a sub pressure reducing chamber 33. The main pressure reducing chamber 32 and the sub pressure reducing chambers 33 are made to communicate with each other through holes not shown in the drawings. The sub pressure reducing chamber portions 31, 31 disposed on both left and right sides have the same configuration. The sub pressure reducing chamber portions 31, 31 disposed at two locations are integrally fixed to both left and right side walls of the main pressure reducing chamber portion 30 respectively. A plurality of ventilation holes 35 are formed in each sub pressure reducing chamber portions 31, 31 at an equal interval in a longitudinal direction such that the ventilation holes 35 penetrate a bottom portion 34 of the sub pressure reducing chamber portions 31, 31. To compare the arrangement number of the plurality of ventilation holes 35 with the arrangement number of the plurality of suction holes 21 formed in the endless traveling belt 20 in terms of the same length (distance), the arrangement number of the ventilation holes 35 is set larger than the arrangement number of the suction holes 21. That is, the suction holes 21 and the ventilation holes 35 are arranged such that at least some of the suction holes 21 and some of the ventilation holes 35 communicate with each other in any situation during driving of the endless traveling belt 20.

The gear box 6 is fixed to a rear wall portion 36 which is a side wall of the main pressure reducing chamber portion 30. As described with reference to FIG. 1, the first motor 7 and the second motor 8 are mounted in the gear box 6. As shown in FIG. 1 and FIG. 2, in the first drive part 2 and the second drive part 3, a drive wheel support plate 38 is fixed to a rear side of an outer side wall portion 37 of each sub pressure reducing chamber portion 31, 31. A drive wheel support plate 40 is fixed to a rear side of an inner side wall portion 39 of each sub pressure reducing chamber portion 31, 31. The drive wheels 10, 14 each is disposed between the drive wheel support plate 38 and the drive wheel support plate 40, and is rotatably supported by ball bearings or the like not shown in the drawings. As described previously, the teeth are formed on the outer periphery of the drive wheel 10, 14.

A driven wheel support plate 41 is fixed to a front side of the outer side wall portion 37 of each sub pressure reducing chamber portion 31, 31. On the other hand, a driven wheel support plate 42 is fixed to a front side of the inner side wall portion 39 of each sub pressure reducing chamber portion 31, 31. Two driven wheels 16, 16 each are arranged between the driven wheel support plate 41 and the driven wheel support plate 42, and are rotatably supported by ball bearings or the like not shown in the drawings. The teeth are formed on outer peripheries of the driven wheels 16, 16. As shown in FIG. 1 and FIG. 2, elongated holes 43 are formed in respective drive wheel support plates 38, 40 and the respective driven wheel support plates 41, 42. The elongated holes 43 are formed so as to mount the respective drive wheel support plates 38, 40 and the respective driven wheel support plates 41, 42 on the sub pressure reducing chamber portions 31 using screws or the like not shown in the drawings. With the formation of these elongated holes 43, the respective drive wheel support plates 38, 40 and the respective driven wheel support plates 41, 42 can be moved in the longitudinal direction. Accordingly, it is possible to perform the adjustment such that a proper tension is applied to the respective endless traveling belts 20, 20 by moving the drive wheels 10, 14 and the drive wheels 16, 16 in the longitudinal direction. Each endless traveling belt 20, 20 is sandwiched between the drive wheel support plate 38 on an outer side and the drive wheel support plate 40 on an inner side and between the driven wheel support plate 41 on the outer side and the inner driven wheel support plate 42 on the inner side. With such a configuration, the positions of the endless traveling belts 20, 20 are restricted so as not to be derailed from the drive wheels 10, 14 and the driven wheels 16, 16.

As shown in FIG. 2, the endless traveling belt 20 is formed by laminating and fixedly adhering a timing belt 45 which forms one example of a power transmission belt on an inner side and a traveling belt 46 on an outer side to each other. It is preferable that a thickness of the timing belt 45 be far smaller than a thickness of the traveling belt 46, and the timing belt 45 be formed using a soft elastic material. The teeth are formed on an inner side of the timing belt 45 such that protruding portions and recessed portions respectively extend laterally and the protruding portion and the recessed portion are disposed adjacently to each other in the longitudinal direction. These teeth mesh with the teeth formed on the drive wheels 10, 14 and the driven wheels 16, 16 so that the rotation of the drive wheels 10, 14 is converted into a linear movement of the endless traveling belts 20, 20 in a longitudinal direction without causing slippage. With respect to the suction holes 21 formed in the endless traveling belts 20, 20, a penetration hole 49 which forms a center portion of the suction hole 21 penetrates the traveling belt 46 and the timing belt 45, and communicates with the ventilation hole 35 (see FIG. 3B). In FIG. 2, the penetration holes 49 are not shown. The traveling belt 46 is formed using a porous semi-independent semi-continuous foamed material. The semi-independent semi-continuous foamed material is a material which is porous and yet has airtightness, has soft elasticity so as to be easily compressed. A foamed material such as ethylene propylene rubber (EPDM) is named, for example. It is preferable that the traveling belt 46 have a large friction coefficient with respect to a wall surface so that causes minimum slippage with respect to the wall surface. The timing belt 45 may be also referred to as a cam belt or a cogged belt. Further, the traveling belt 46 is referred to as a crawler or the like in construction heavy machines. The timing belt 45 slides on the bottom portion 34 of the sub pressure reducing chamber 33. Next, the configuration of the suction hole 21 formed in the endless traveling belt 20 is described with reference to FIGS. 3A and 3B.

Figure 3A:
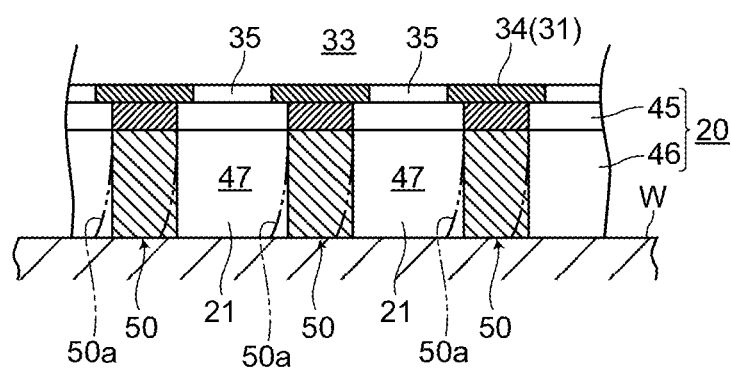
Figure 3B:
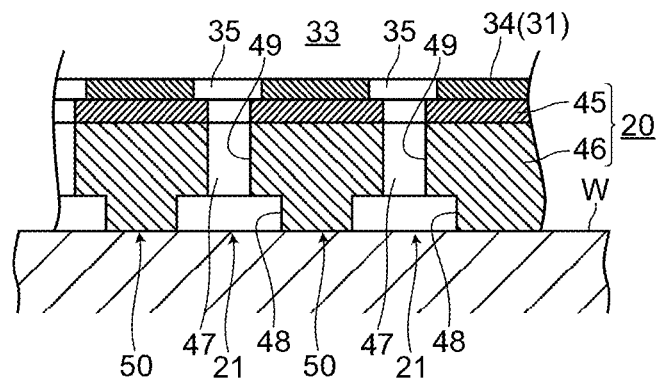

FIGS. 3A and 3B are cross-sectional views showing a part of the configuration of the suction holes 21 in cross section in an enlarged manner, wherein FIG. 3A shows the configuration based on a technique which the inventors of the present invention created previously (hereinafter, referred to as previously created technique), and FIG. 3B shows the configuration according to this embodiment. In FIG. 3A and FIG. 3B, to describe these configurations in comparison, same symbols are given to same functional portions. As shown in FIG. 3A, the endless traveling belt 20 according to the prior art is formed of a timing belt 45 and a traveling belt 46, and suction holes 21 having the same opening area penetrate the timing belt 45 and the traveling belt 46. In the traveling belt 46, the suction holes 21 disposed adjacently to each other are partitioned by a partition wall 50 (also see FIG. 2). Ventilation holes 35 which communicate with the suction holes 21 are formed in the bottom portion 34 of the sub pressure reducing chamber 33. The partition wall 50 is a rectangular parallelepiped body having a narrow width in a longitudinal direction. A suction chamber 47 is a space defined by the ventilation hole 35 and a wall surface W. When a pressure in the sub pressure reducing chamber 33 (suction chamber 47) is reduced, the traveling belt 46 is sucked by the wall surface W so that the partition wall 50 is compressed in a vertical direction. As described previously, the traveling belt 46 is formed using a material which has soft elasticity and is easily compressed and hence, when the wall surface W is sucked, the partition wall 50 is easily deformed by buckling as indicated by a double dashed chain line (50*a*) shown in FIG. 3A due to a compressive force in the vertical direction. A shape of the partition wall 50 after deformation is shown in an exaggerating manner. When the partition wall 50 is deformed in this manner, there is a possibility that air leakage occurs between the wall surface W and the traveling belt 46 so that a suction force becomes unstable. In view of above, according to this embodiment, as shown in FIG. 3B, the suction hole 21 (suction chamber 47) has the two-stage hole configuration.

As shown in FIG. 3B, the suction hole 21 is formed of: a suction recessed portion 48 which opens on a wall surface W side and has a quadrangular shape as viewed from above; and the penetration hole 49 which penetrates the traveling belt 46 and the timing belt 45 from the suction recessed portion 48 to the sub pressure reducing chamber 33. The penetration hole 49 is formed at a center portion of the suction recessed portion 48, and is formed into a rectangular parallelepiped shape having a quadrangular planar shape. In other words, a columnar portion of the partition wall 50 on a side where the partition wall 50 is in contact with the wall surface W has a shape of the same width as the previously created technique, and a columnar portion on a sub pressure reducing chamber 33 side has a far larger cross-sectional area than the columnar portion on the wall surface W side. With such a configuration, even when the wall surface W is strongly sucked, there is substantially no possibility that the partition wall 50 is deformed by buckling. A depth of the suction recessed portion 48 may have a large depth provided that a gap is not formed between the traveling belt 46 and the wall surface W even when the traveling belt 46 is compressed during traveling. In the case where an opening area of the suction recessed portion 48 is set equal to an opening area of the suction hole 21 of the previously created technique, a suction force is not lowered. In the above-mentioned configuration, an open shape of the suction recessed portion 48 may be a rectangular shape as shown in FIG. 2, and the penetration hole 49 may be formed into a quadrangular columnar shape or a circular cylindrical shape. The protrusions and the recessed portions (teeth) formed on the inner surface of the timing belt 45 are compressed when the wall surface W is sucked so that a periphery of the penetration hole 49 has airtightness. Although the configuration of the ventilation hole 35 is described in a simplified manner in FIG. 3B, in this embodiment, an open/close unit 55 which releases or closes the suction hole 35 communicating with the sub pressure reducing chamber 33 (see FIGS. 4A and 4B) is disposed in the ventilation hole 35. Next, the configurations of the ventilation hole 35 and the open/close unit 55 are described in detail with reference to FIGS. 4A and 4B.

Figure 4A:
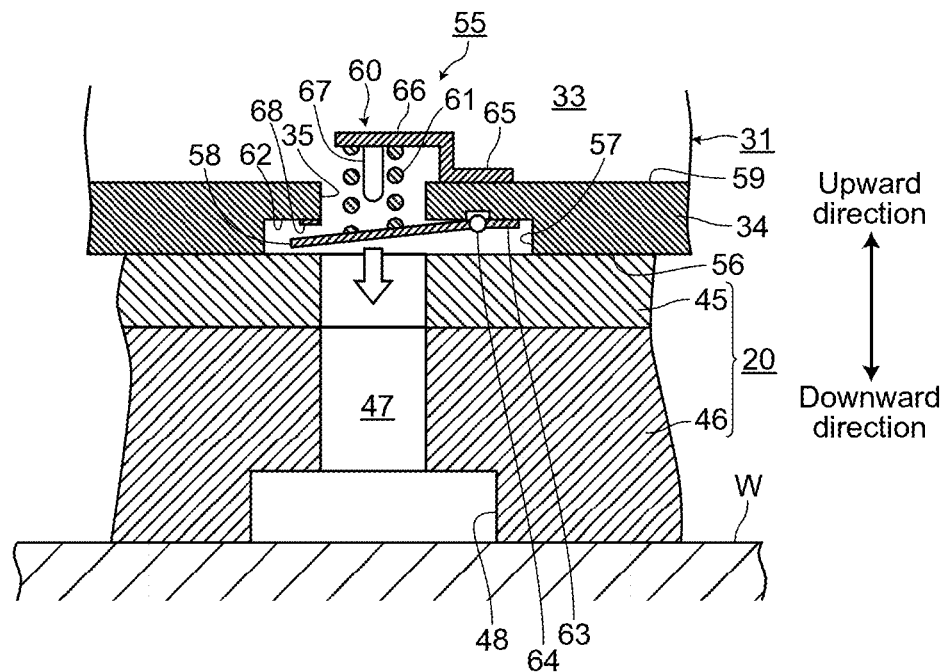
FIGS. 4A and 4B are views for describing one example of the configuration and the manner of operation of an open/close unit which the suction traveling device shown in FIG. 1 and FIG. 2 has, and also is an explanatory view schematically showing constitutional elements of the suction traveling device.
Figure 4B:
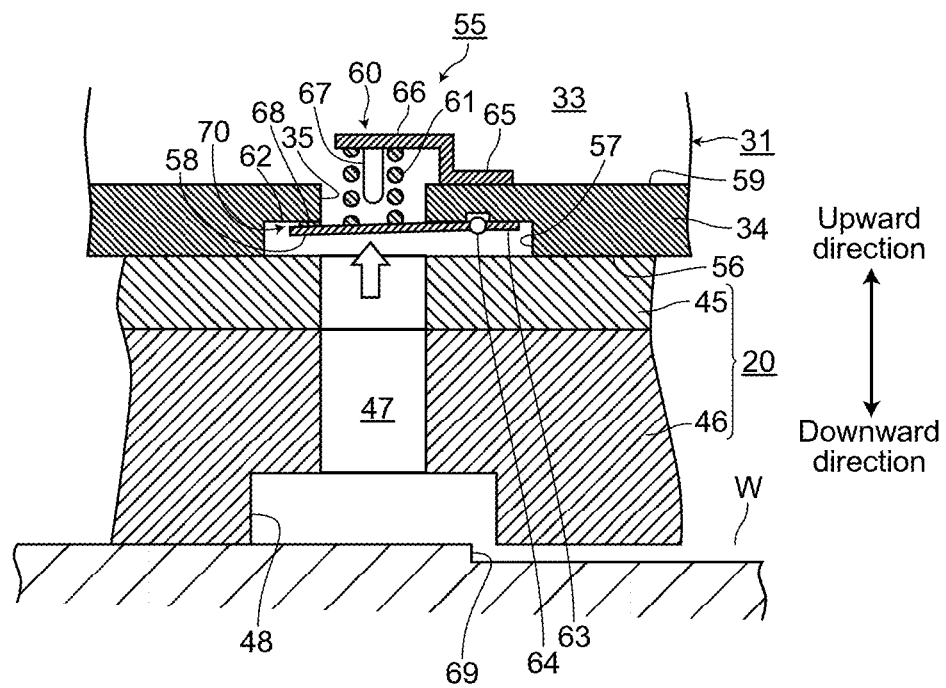

FIGS. 4A and 4B are views for describing one example of the configuration and the manner of operation of the open/close unit 55. FIGS. 4A and 4B are also explanatory views schematically describing constitutional elements of the open/close unit 55. FIG. 4A shows a state where both a pressure in the sub pressure reducing chamber 33 and a pressure in the suction chamber 47 exhibit a negative pressure with respect to an atmospheric pressure. FIG. 4B shows a state where a pressure in the sub pressure reducing chamber 33 exhibits a negative pressure with respect to an atmospheric pressure, and a pressure in the suction chamber 47 exhibits an atmospheric pressure (positive pressure). As shown in FIG. 4A, the open/close unit 55 is disposed on the bottom portion 34 of the sub pressure reducing chamber portion 31. The open/close unit 55 is capable of opening or closing the ventilation hole 35 which communicates with the suction chamber 47. The open/close unit 55 is formed of: a valve element 58 disposed in a recessed portion 57 which is recessed from a lower surface 56 of the bottom portion 34 in a vertical direction; the receiving plate 60 having an approximately crank shape which is fixed to an upper surface 59 of the bottom portion 34; and a coil spring 61 formed of an elastic member which constantly biases the valve element 58 to the wall surface W side.

A base portion 63 of the valve element 58 which forms one end portion of the valve element 58 is fixed to a bottom surface 62 in the recessed portion 57, and the valve element 58 and the base portion 63 are connected to each other by a hinge 64. The valve element 58 is swingable in a vertical direction using the hinge 64 as a rotary shaft. The receiving plate 60 has a receiving portion 66 which is bent upward from the base portion 65 fixed to the upper surface 59 of the bottom portion 34, and extends over the ventilation hole 35. A guide shaft 67 is mounted on the receiving portion 66 in an upright manner. The guide shaft 67 extends in the ventilation hole 35, and guides the coil spring 61 such that the coil spring 61 is not inclined. One end portion of the coil spring 61 is brought into contact with the receiving portion 66, and the other end portion of the coil spring 61 biases the valve element 58 toward the wall surface W side. A pad 68 is adhered to the bottom surface 62 of the recessed portion 57 on a periphery of the ventilation hole 35. For example, the pad 68 is formed of a sheet such as a semi-independent semi-continuous foamed material having high compressibility in the same manner as the traveling belt 46, and a plurality of pads 68 are adhered intermittently around the ventilation hole 35 at one location or at a fixed interval with a gap therebetween.

FIG. 4A shows that the traveling belt 46 is brought into close contact with the wall surface W so that the suction chamber 47 is brought into a hermetic state. The suction chamber 47 is suctioned by vacuum using a blower unit 5 (see FIG. 1) by way of the main pressure reducing chamber 32 and the sub pressure reducing chamber 33. The valve element 58 is pressed by the coil spring 61 so as to release the ventilation hole 35 and hence, the sub pressure reducing chamber 33 and the suction chamber 47 communicate with each other whereby an internal pressure in the sub pressure reducing chamber 33 and an internal pressure in the suction chamber 47 become equal. That is, both a pressure in the sub pressure reducing chamber 33 and a pressure in the suction chamber 47 exhibit a negative pressure with respect to an atmospheric pressure outside the traveling belt 46. An elastic force of the coil spring 61 is set such that deflection of the coil spring 61 is released when a pressure in the sub pressure reducing chamber 33 and a pressure in the suction chamber 47 are equal, and the valve element 58 opens the ventilation hole 35. A size of the valve element 58 is set such that the valve element 58 is not brought into contact with the timing belt 45 in such a state. Next, the case where the valve element 58 closes the ventilation hole 35 is described with reference to FIG. 4B. The constitutional elements described in FIG. 4B are equal to the constitutional elements described in FIG. 4A and hence, the description of the constitutional elements is omitted.

FIG. 4B shows the case where a step 69 is formed on the wall surface W, and the suction recessed portion 48 moves to the position where the step is formed during traveling. In such a case, a gap is formed between the traveling belt 46 and the wall surface W because of the presence of the step 69 and hence, a pressure in the suction chamber 47 and an outside atmospheric pressure become equal. Vacuum suction is continued in the sub pressure reducing chamber 33 and hence, a pressure in the sub pressure reducing chamber 33 exhibits a negative pressure with respect to an atmospheric pressure. That is, a pressure in the suction chamber 47 is higher than a pressure in the sub pressure reducing chamber 33. When this pressure difference becomes larger than an elastic force of the coil spring 61, the valve element 58 is pressed in a direction that the ventilation hole 35 is closed and hence, the valve element 58 is brought into close contact with the bottom surface 62 of the recessed portion 57 and closes the ventilation hole 35 unless the pads 68 are provided. Then, the traveling belt 46 gets over the step 69, and the suction chamber 47 is closed by the wall surface W. Even in such a case, when the ventilation hole 35 is closed by the valve element 58, a state where a pressure in the suction chamber 47 is higher than a pressure in the sub pressure reducing chamber 33 continues whereby there is no possibility that the valve element 58 opens and a suction force is not generated in the suction chamber 47.

In this embodiment, the pads 68 are disposed intermittently on the periphery of the ventilation hole 35. Due to the provision of the pads 68, a region formed of gaps 70 of an amount corresponding to a thickness of the pads 67 is formed between the valve element 58 and the bottom surface 62 of the recessed portion 57. When the traveling belt 46 gets over the step 69 and a pressure in the suction chamber 47 is reduced, since the suction chamber 47 and the sub pressure reducing chamber 33 communicate with each other through the gaps 70, a pressure in the sub pressure reducing chamber 33 and a pressure in the suction chamber 47 become equal whereby the valve element 58 is pressed in a direction that the ventilation hole 35 is released. Accordingly, a state shown in FIG. 4A can be restored. Since the gaps 70 are small and a vacuum suction force is large, a suction force can be ensured also in a state shown in FIG. 4B. The open/close unit 55 shown in FIGS. 4A and 4B is one example, and the open/close unit 55 is not limited to such a configuration. For example, the valve element 58 may be integrally connected with the coil spring 61, and the valve element 58 may be moved following the deflection of the coil spring 61. Further, in place of the pads 68, projections may be formed on the valve element 58 or projections may be formed on the bottom surface 62 of the recessed portion 57. Still further, a so-called ball valve may be adopted by forming the valve element 58 into a spherical body, and a pad having the same function as the above-mentioned pads 68 may be disposed at a contact portion between the ventilation hole 35 and the spherical body. The provision of the open/close unit 55 is effective in the case where a pressure in the sub pressure reducing chamber 33 is smaller than a pressure in the suction chamber 47 such as a case where the wall surface W has an unevenness or a case where a dust or dirt adheres to the wall surface W.

Next, the endless traveling belt 20 which enables traveling of the suction traveling device in the case where a step or the like is formed on the wall surface W is described with reference to FIGS. 5A to 5C.

Figure 5A:
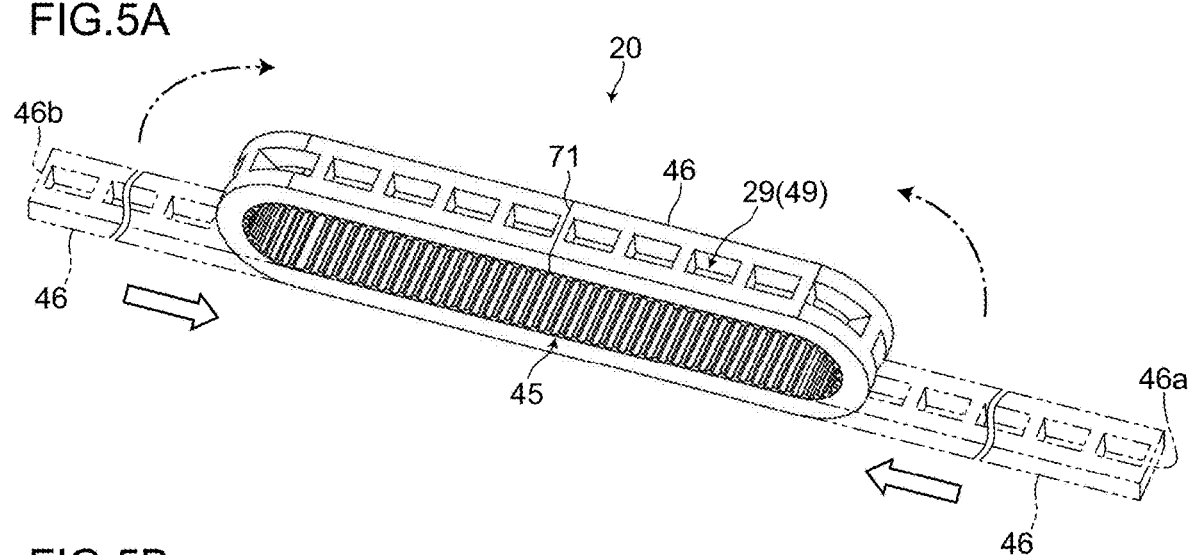
Figure 5B:
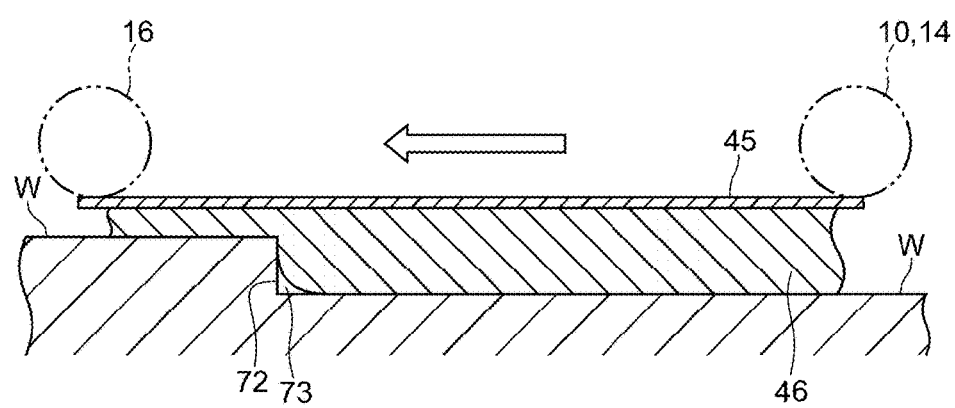
Figure 5C:
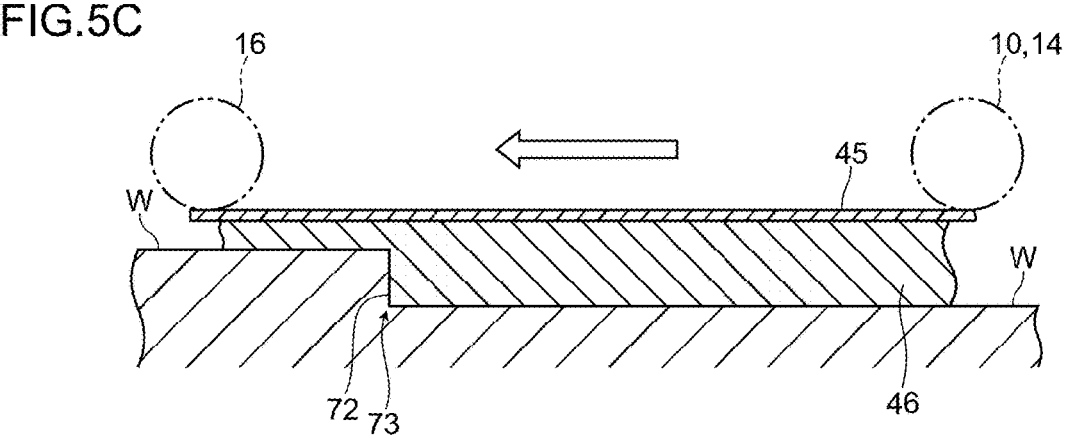

FIGS. 5A to 5C are explanatory views showing the configuration and the manner of operation of the endless traveling belt 20. FIG. 5A is a perspective view showing a method of manufacturing the endless traveling belt 20, FIG. 5B shows the state where the endless traveling belt 20 according to the previously created technique travels on a wall surface having a step, and FIG. 5C is a partial cross-sectional view showing a state where the endless traveling belt 20 according to this embodiment travels on a wall surface having a step. As shown in FIG. 5A, the endless traveling belt 20 is formed by laminating the traveling belt 46 to a surface of the timing belt 45 having an annular shape on a side opposite to a teeth forming surface. The traveling belt 46 has a developed length as indicated by a double dashed chain line in the drawing. The traveling belt 46 is adhered to the timing belt 45 in a wrapped manner while compressing the timing belt 45 in a length direction (direction indicated by an arrow in the drawing) such that a compression ratio takes a value which falls within a range of from 50% to 80%. Both end portions 46a, 46b of the traveling belt 46 are adhered to each other at a connecting portion 71. As described previously, the traveling belt 46 is formed of the flexible and porous semi-independent semi-continuous foamed material. Accordingly, a foamed portion of the traveling belt 46 is mainly compressed. However, the deformations of a thickness and a width of the traveling belt 46 by compression are so small that the deformations can be ignored. The timing belt 45 is held in a fixed shape by a core or the like not shown in the drawing. The core may preferably have frame portions which restrict positions of the timing belt 45 and the traveling belt 46 in a width direction. The through holes 49 formed in the timing belt 45 (see FIG. 3B) and the suction holes 21 formed in the traveling belt 46 may be formed before adhesion by correcting the positions of the penetration holes 49 and the suction holes 21 by calculation based on a compression ratio, or may be formed after adhesion. Although the penetration hole 49 penetrates the timing belt 45 and the traveling belt 46 as shown in FIGS. 3A and 3B, the penetration holes 49 are shown in FIG. 5A with a part omitted.

Next, meaning of adhering the traveling belt 46 to the timing belt 45 in a compressed state is described with reference to FIG. 5B and FIG. 5C. As shown in FIG. 5B, in the case where the wall surface W has a stepped portion 72 in an advancing direction (direction indicated by an arrow in the drawing) of the suction traveling device 1, since the traveling belt 46 is formed of a semi-independent semi-continuous foamed material, the traveling belt 46 is deformed by compression so as to absorb a step of the stepped portion 72 of the wall surface W. In this case, the traveling belt 46 of the previously created technique which is not adhered by compression is stretched in front of and behind the stepped portion 72 and hence, a gap 73 is formed between the traveling belt 46 and the stepped portion 72. When the suction hole 21 formed in the traveling belt 46 arrives at the stepped portion 72, air leakage occurs so that a suction force is lowered. A tension is applied to the timing belt 45 by the drive wheels 10, 14, and the driven wheels 16, 16 and hence, the timing belt 45 is not substantially deformed.

In this embodiment where the traveling belt 46 is adhered to the timing belt 45 in a compressed state, as shown in FIG. 5C, even when the traveling belt 46 is stretched in front of and behind the stepped portion 72, the traveling belt 46 is deformed following the stepped portion 72 and hence, the gap 73 does not substantially formed. Accordingly, even when the suction hole 21 formed in the traveling belt 46 arrives at the stepped portion 72, there is no possibility that air leakage occurs and hence, a suction force is maintained. FIGS. 5A to 5C show the case where the suction traveling device 1 gets over the stepped portion 72. However, the above-mentioned configuration of this embodiment is effectively applicable to the case where the suction traveling device 1 goes down the stepped portion 72, the case where a plurality of stepped portions are continuously formed and the like.

It is estimated that the suction traveling device 1 is used as a preferred device for performing an operation such as maintenance and inspection or cleaning of a wall surface (including a glass surface) of a large structure such as a wall of a building, an elevated portion of an expressway, or a bridge pier. Accordingly, a device which performs the above-mentioned operation is mounted on the suction traveling device 1. In this case, the suction traveling device 1 includes a mounting frame 75 as a mounting member for mounting a device for performing such an operation on the suction traveling device 1. The mounting frame 75 is described with reference to FIGS. 6A and 6B.

Second Embodiment

Figure 6A:
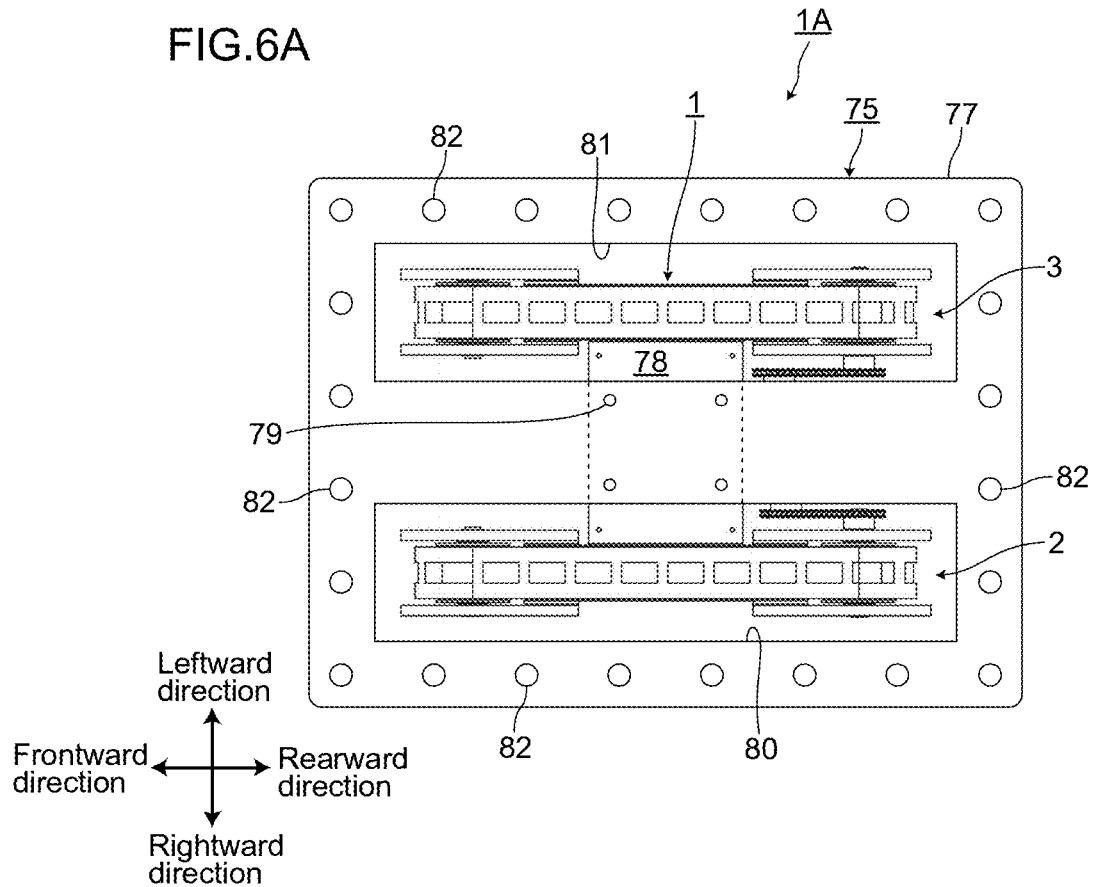
Figure 6B:
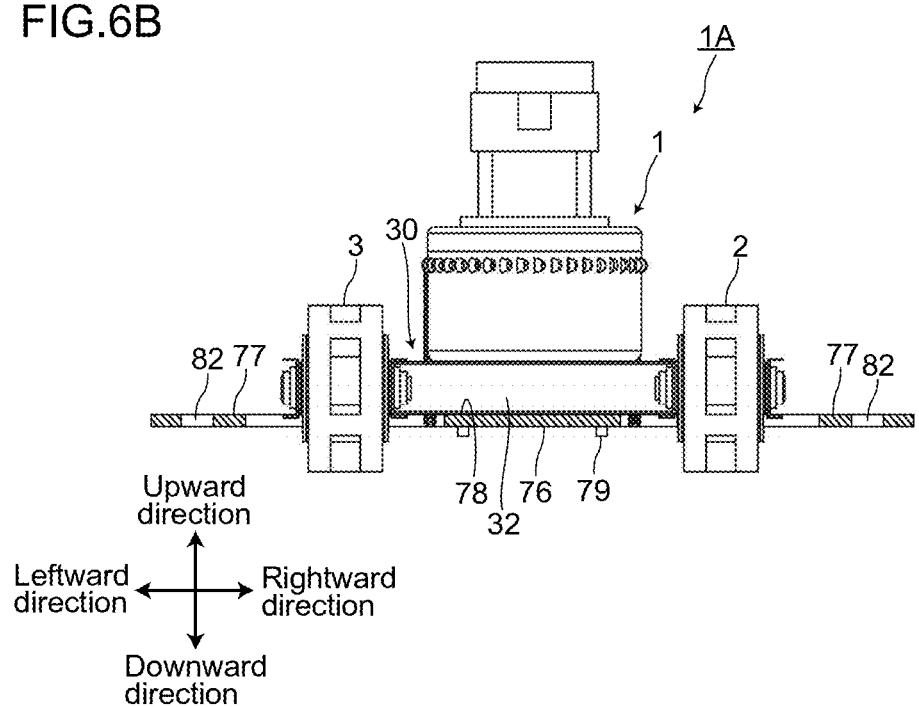

FIGS. 6A and 6B show a suction traveling device 1A according to a second embodiment where the mounting frame 75 is fixed to the suction traveling device 1A. FIG. 6A is a plan view of the suction traveling device 1A as viewed from a wall surface W side (lower side), and FIG. 6B is a plan view of the suction traveling device 1A as viewed from a front side. As shown in FIG. 6A and FIG. 6B, the mounting frame 75 is mounted on the suction traveling device 1A. The mounting frame 75 is formed of: a center beam portion 76 which penetrates between a first drive part 2 and a second drive part 3 in a longitudinal direction; and a frame portion 77 which is connected to both end portions of the center beam portion 76 in the longitudinal direction, and is disposed so as to surround an outer periphery of the suction traveling device 1A. The mounting frame 75 is fixed to a bottom portion 78 of a main pressure reducing chamber portion 32 by fixing screws 79 at the center beam portion 76. At a fixing portion where the mounting frame 75 is fixed to the suction traveling device 1A by the fixing screws 79, airtightness of the main pressure reducing chamber portion 30 is maintained by packings or the like.

Accommodating hole portions 80, 81 are formed in the mounting frame 75 for accommodating the first drive part 2 and the second drive part respectively. The mounting frame 75 includes the frame portion 77, and a plurality of hole portions 82 are disposed so as to surround the entire circumference of the suction traveling device 1A. These hole portions 82 are mounting holes for mounting the previously mentioned device for performing an operation such as maintenance and inspection or cleaning of a wall surface (including a glass surface) of a large structure such as a wall of a building, an elevated portion of an expressway, or a bridge pier. The number of the hole portions 82, the arrangement of the hole portions 82 and a shape of the hole portion 82 can be arbitrarily changed depending on a device which is an object to be mounted on the suction traveling device 1A. The hole portions 82 can be also used as mounting holes for mounting hinges 85 (see FIGS. 7A and 7B) used in the case described later with reference to FIGS. 7A, 7B and FIG. 8 where a plurality of suction traveling devices 1B, 1C are connected to each other. The shape of the mounting frame 75 shown in FIGS. 6A and 6B is one example, and the shape of the mounting frame 75 can be changed as desired depending on a method of using the suction traveling device 1A and a place where the suction traveling device 1A is used. The mounting frame 75 can be used in suction traveling devices other than the suction traveling device 1 according to the first embodiment. Next, the configuration where a plurality of suction traveling devices 1A are connected to each other using the above-mentioned mounting frame 75 is described with reference to FIGS. 7A, 7B and FIG. 8.

Third Embodiment

Figure 7A:
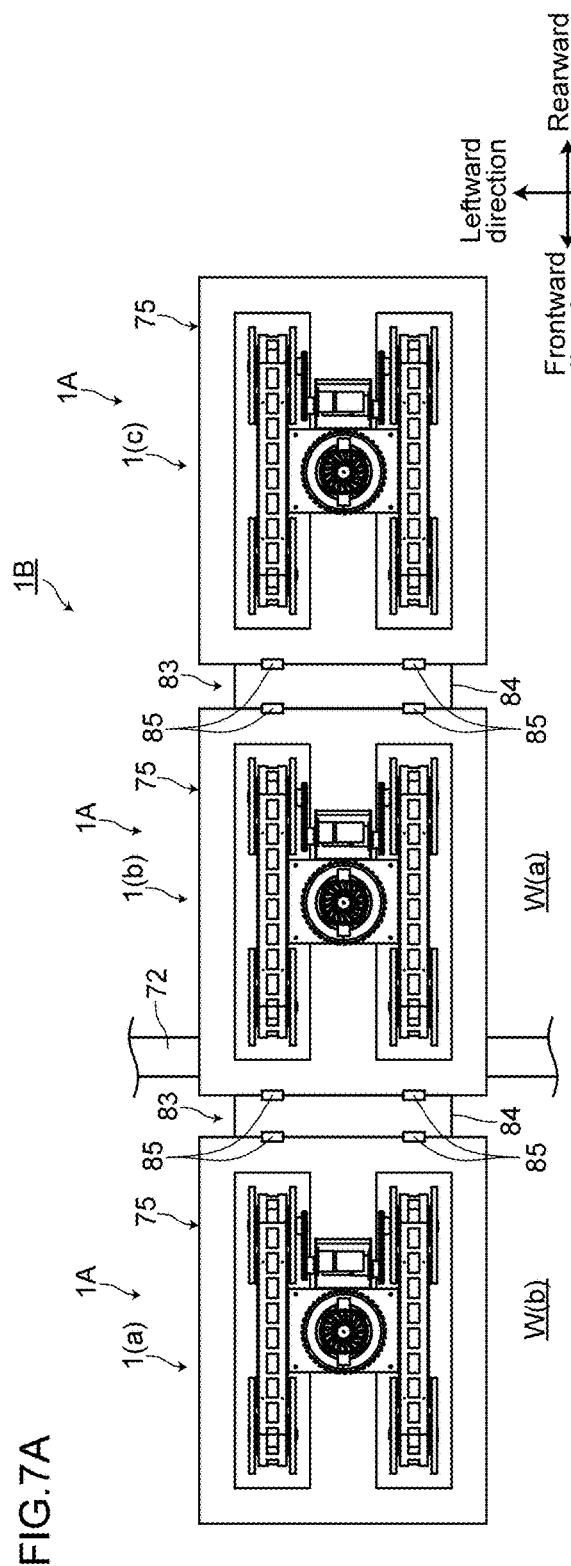
Figure 7B:
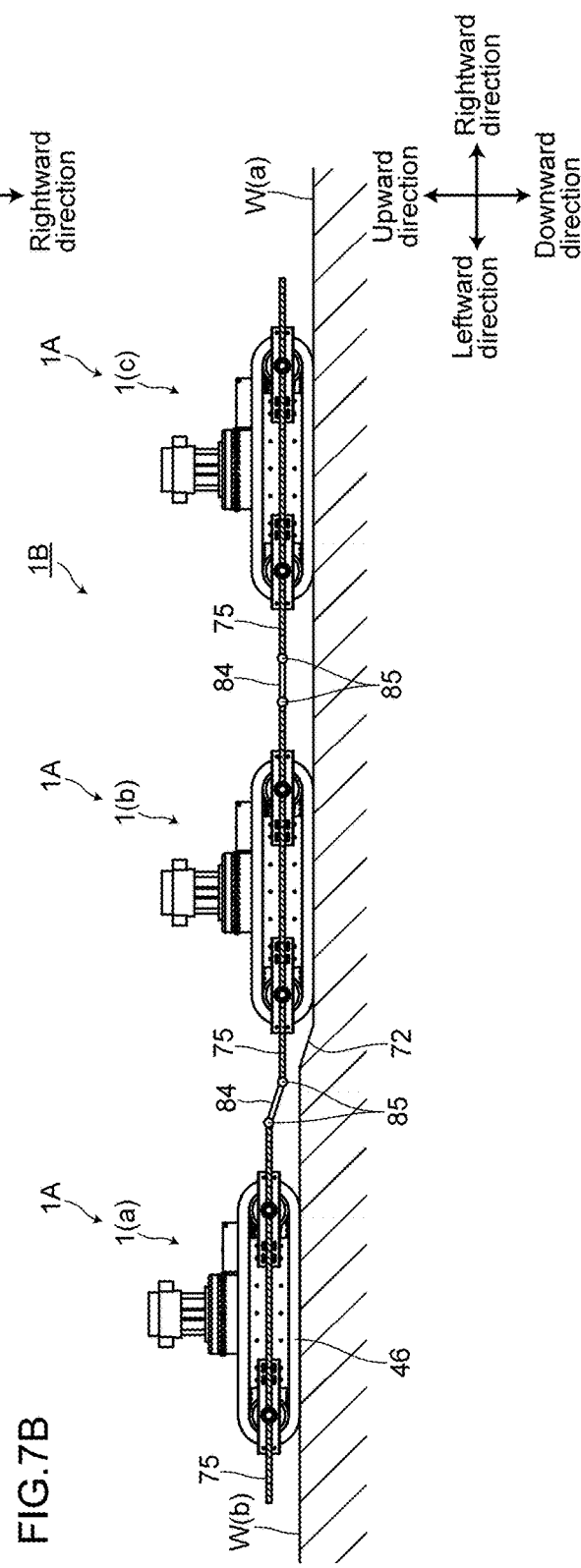

FIGS. 7A and 7B show a suction traveling device 1B according to a third embodiment. FIGS. 7A and 7B show an example where a plurality of suction traveling devices 1A having the previously mentioned configuration are connected to each other in a traveling direction (longitudinal direction). In FIGS. 7A and 7B, the case is shown where three suction traveling devices 1A are connected to each other in tandem as an example. FIG. 7A is a plan view of the connected three suction traveling devices 1A as viewed from an upper side, FIG. 7B is a side view of the connected three suction traveling devices 1A as viewed from a right side in FIG. 7A. In FIG. 7A, the illustration of hole portions 82 (see FIGS. 6A and 6B) is omitted. In FIG. 7A and FIG. 7B, the suction traveling devices 1B are described as the suction traveling device 1(*a*), the suction traveling device 1(*b*), and the suction traveling device 1(*c*) in order from a front side toward a rear side. A wall surface W has a reference surface W(a) and a stepped surface W(b) stepped from the reference surface W(a). A mounting frame 75 is fixed to the suction traveling devices 1(*a*), 1(*b*), 1(*c*) respectively. The respective suction traveling devices are connected to each other by connecting units 83. The connecting unit 83 has a connecting plate 84 and two pairs of hinges 85. The respective mounting frames 75 of the suction traveling device 1(*a*) and the suction traveling device 1(*b*) are connected to each other by the hinges 85 by way of the connecting plate 84, and the respective mounting frames 75 of the suction traveling device 1(*b*) and the suction traveling device 1(*c*) are connected to each other by the hinges 85 by way of the connecting plate 84.

The suction traveling devices 1(*a*), 1(*b*), 1(*c*) are connected to each other by way of the respective hinges 85 and hence, the connecting plate 84 is bendable by the hinges 85 following the stepped portion 72 of the wall surface W. In the example shown in FIG. 7B, the suction traveling devices 1(*b*), 1(*c*) are adhered to the reference surface W(a) by suction, and the suction traveling device 1(*a*) is adhered to the stepped surface W(b) by suction. In such a state, when the suction traveling device 1(*a*) is about to get over the stepped portion 72, the suction traveling devices 1(*b*), 1(*c*) travel on the reference surface W(a) while adhering to the reference surface W(a) by suction, and allows the suction traveling device 1(*a*) to get over the stepped portion 72 while supporting and moving by pushing the suction traveling device 1(*a*). Since the traveling belt 46 is compressible as shown in FIG. 5C, the suction traveling device 1(*a*) can get over the stepped portion 72 while maintaining a suction force by suppressing leakage of air, and is adhered to the stepped surface W(b) by suction. In the case where the traveling direction of the suction traveling devices 1(*a*), 1(*b*), 1(*c*) are opposite compared to the above-mentioned case, that is, in the case where the suction traveling device 1(*c*) descends on the stepped portion 72 from the stepped surface W(b) to the reference surface W(a), the suction traveling devices 1(*a*), 1(*b*) travel while adhering to the stepped surface W(b) by suction, and allow the suction traveling device 1(*c*) to descend on the stepped portion 72 while supporting and moving by pushing the suction traveling device 1(*c*). Since the traveling belt 46 is compressible as shown in FIG. 5C, the suction traveling device 1(*c*) arrives at the reference surface W(a) while maintaining a suction force while suppressing leakage of air.

The suction traveling device 1(*b*) disposed in the middle between the suction traveling devices 1(*a*), 1(*c*) can travel while being supported by the suction traveling devices 1(*a*), 1(*c*). For example, also in the case where the suction traveling device 1(*c*) is disposed at a trailing end, the suction traveling devices 1(*a*), 1(*b*) are adhered to the wall surface W by suction, and the suction traveling device 1(*c*) can be made to travel. In FIGS. 7A and 7B, the case is exemplified where three suction traveling devices 1 are connected to each other in the suction traveling devices 1B. However, the suction traveling devices 1B may be formed such that two suction traveling devices 1A are connected to each other or three or more suction traveling devices 1A are connected to each other. Further, even when suction force is lowered in one of the suction traveling devices 1(*a*) to 1(*c*), traveling of the suction traveling devices 1(*a*) to 1(*c*) is possible due to suction forces of two other suction traveling devices. This example of the plurality of mounting frames 75 is also applicable to other suction traveling devices other than the suction traveling device 1 according to the first embodiment. In FIGS. 7A and 7B, in the suction traveling devices 1B, the suction traveling devices 1A are connected to each other in an advancing direction (longitudinal direction). However, the plurality of suction traveling devices 1A can be connected to each other in a direction orthogonal to the advancing direction. Such a configuration is described with reference to FIG. 8.

Fourth Embodiment

FIG. 8 is a view showing a suction traveling device 1C according to a fourth embodiment. FIG. 8 is a plan view showing an example where a plurality of suction traveling devices 1A are connected to each other in a traveling direction (a longitudinal direction) and a direction orthogonal to the traveling direction (lateral direction). In FIG. 8, the illustration of hole portions 82 (see FIGS. 6A and 6B) is omitted. In FIG. 8, an example is shown where two suction traveling devices 1A are connected to each other in an advancing direction as well as in a lateral direction. However, three or more suction traveling devices 1A can be connected to each other in the advancing direction as well as in the lateral direction. Further, the suction traveling devices 1A may not be connected to each other in the traveling direction. A mounting frame 75 is fixed to the suction traveling device 1A. The respective mounting frames 75 of the suction traveling devices 1A disposed adjacently to each other are connected to each other by hinges 85 by way of connecting plates 84. The respective suction traveling devices 1A are connected to each other by way of the respective hinges 85. Accordingly, also in a case where a wall surface W has a stepped portion (for example, the stepped portion 72 shown in FIG. 7B or the like) or the wall surface W has a stepped portion in a lateral direction, the suction traveling devices 1A are deflectable following the step portion. A suction traveling device 1C which is formed by connecting the plurality of suction traveling devices 1A has a suction force equal to suction forces of four suction traveling devices 1A. Accordingly, for example, the suction traveling device 1C can travel vertically on the wall surface W in a state where a weight four times as large as a weight when only one suction traveling device 1A is used is loaded on the suction traveling device 1C. This example using the plurality of mounting frames 75 is also applicable to the suction traveling device according to the first embodiment or other suction traveling devices. The suction traveling devices 1B, 1C arranged in tandem shown in FIGS. 7A, 7B and FIG. 8 can mount the previously mentioned devices by making use of hole portions 82 (see FIG. 6A) other than mounting portions of the hinges 85.

The suction traveling devices 1, 1A, 1B, 1C described above which are capable of traveling on the wall surface W which is a traveling surface while adhering to the traveling surface by suction each include: the first drive part 2 and the second drive part 3 each having the endless traveling belt 20 in which the plurality of suction holes 21 partitioned by the partition walls 50 are formed; the main pressure reducing chamber 32 where a pressure is reduced by the blower motor unit 5 which is the air suction device, the sub pressure reducing chambers 33 each communicating with the main pressure reducing chamber 32 and being disposed in the first drive part 2 and the second drive part 3; the plurality of ventilation holes 35 formed in the sub pressure reducing chamber 33, the plurality of ventilation holes 35 being disposed on a side of the sub pressure reducing chamber 33 where the suction holes 21 are disposed, the plurality of ventilation holes 35 being provided for making the sub pressure reducing chambers 33 and the plurality of respective suction holes 21 communicate with each other; and the open/close unit 55 for releasing or closing the respective ventilation holes 35. The open/close unit 55 is configured to release the ventilation holes 21 when a pressure in the plurality of suction chambers 47 formed by the wall surface W and the suction holes 21 is equal to a pressure in the sub pressure reducing chamber 33, and is configured to close the ventilation holes 21 when the pressure in the suction chamber 47 is higher than the pressure in the sub pressure reducing chamber 33, and the gap 70 having a size which prevents the pressure in the sub pressure reducing chamber 33 from affecting the pressure in other suction chamber 47 at the time of closing the ventilation hole 21 is formed in the ventilation hole 21.

The ventilation hole 35 which makes the suction chamber 47 and the sub pressure reducing chamber 33 communicate with each other can be released or closed by the open/close unit 55. When a pressure in the sub pressure reducing chamber 33 becomes lower than a pressure in the suction chamber 47 due to leakage of air or the like between the suction chamber 47 and the wall surface W, the open/close unit 55 closes the ventilation hole 35 so as to prevent a pressure in the sub pressure reducing chamber 33 from approaching an atmospheric pressure. Further, ventilation is ensured between the suction chamber 35 and the sub pressure reducing chamber 33 due to the gap 70 formed when the open/close unit 55 is closed and hence, when leakage of air in the suction chamber 47 is eliminated, a pressure in the sub pressure reducing chamber 33 becomes equal to a pressure in the suction chamber 47 and hence, a suction force can be recovered by releasing the ventilation hole 35 using the open/close unit 55. With such a configuration, it is possible to provide the suction traveling device 1, 1A, 1B, 1C capable of maintaining a stable suction force by suppressing a change in a suction force applied to the wall surface W.

An opening area of the suction hole 21 on a sub pressure reducing chamber 33 side is set smaller than an opening area on a wall surface W side. Such a configuration is obtained by increasing a cross-sectional area of the partition wall 50 on a sub pressure reducing chamber 33 side and by decreasing the cross-sectional area of the partition wall 50 on a wall surface W side. Due to such a configuration, it is possible to suppress leakage of air in the suction chamber 47 brought about by buckling deformation of the partition wall 50 generated by strong sucking of the wall surface W. The opening area on a wall surface W side can be ensured at the same level as the conventional opening area. Since a suction force is proportional to an opening area, a high suction force can be maintained.

The suction traveling device 1A has the mounting frame 75 which is fixed to the bottom portions 78 of the main pressure reducing chamber portion 31 on a wall surface W side. The frame portion 77 on which a working device or the like is mountable is disposed outside the first drive part 2 and the second drive part 3 as a part of the mounting frame 75.

With such a configuration, by making use of the frame portion 77 of the mounting frame 75, it is possible to easily mount a working device such as a maintenance and inspection device or a cleaning device for a wall surface (including a glass surface) of a large structure such as a wall of a building, an elevated portion of an expressway, or a bridge pier on the suction traveling device 1A. By forming the plurality of hole portions 82 for mounting the above-mentioned device or the like in the frame portion 77, a device which is a working object can be easily mounted in an exchangeable manner.

A plurality of suction traveling devices 1A can be connected to each other in a traveling direction and/or in a direction orthogonal to the traveling direction by connecting the mounting frames 75 fixed to the main pressure reducing chamber portions 31 to each other using the connecting units 83. The connection of the mounting frames 75 fixed to the main pressure reducing chamber portions 31 to each other by the connecting units 83 means that a plurality of suction traveling devices 1(1A) are connected to each other by the connecting units 83. As a result, it is possible to provide the suction traveling device 1B where the suction traveling devices 1A are connected to each other in a traveling direction and the suction traveling device 1C where the suction traveling devices 1A are connected to each other in a traveling direction and a direction orthogonal to the traveling direction. By allowing the suction traveling device 1 to have a tandem configuration in this manner, a wall surface operation can be operated efficiently even when a wall surface has a large area. That is, compared to the case where the suction traveling device 1 is formed of a single body, a suction force and a traveling force (drive force) can be increased in proportion to the number of suction traveling devices and hence, it is possible to allow the suction traveling device 1 to travel while mounting the above-mentioned working device having a weight corresponding to the number of suction traveling devices.

The connecting unit 83 has: the connecting plate 84 disposed between the mounting frames 75 disposed adjacently to each other; and the hinges 85 which connect the mounting frame 75 and the connecting plate 84 to each other. With such a configuration, with respect to the suction traveling devices 1 which are connected to each other, the connecting plate 84 is swingable about the hinge 85 and hence, each suction traveling device 1 can travel following a step even when the wall surface W has such a step.

The suction traveling device 1, 1A, 1B, 1C each include: the endless traveling belt 20 in which the plurality of suction holes 21 are formed; and the blower motor unit 5 which forms the air suction device for sucking air on a suction hole 21 side. The suction traveling device 1, 1A, 1B, 1C is configured to perform at least one of moving forward or moving backward due to rotation of the endless traveling belt 20 in a state where a posture of the endless traveling belt 20 is maintained while adhering to the wall surface W which forms a traveling surface by suction. The suction traveling device 1, 1A, 1B, 1C further includes the open/close unit 55 for transmitting a reduction of a pressure generated by the blower motor unit 5 to a suction hole 21 side or not for imparting the reduction of a pressure to the suction hole 21 side, and the open/close unit 55 is configured to reduce a pressure in the suction hole 21 by opening the valve element 58 in a state where a suction hole 21 side does not communicate with an external space, and is configured to prevent a pressure on the suction hole side 21 from not being reduced due to continuation of a closed state of the open/close unit 83 when a non-communication state is restored by closing the valve element 58 while forming a slight gap 70 in a state where the suction hole 21 side communicates with an external space and a pressure on the suction hole 21 side is an atmospheric pressure.

The ventilation hole 35 can be released or closed by the open/close unit 55. The open/close unit 55 is configured such that, when a pressure in the suction chamber 47 is higher than a pressure in the sub pressure reducing chamber 33 due to leakage of air between the suction chamber 47 and the wall surface W or the like, the open/close unit 55 prevents a pressure in the sub pressure reducing chamber 33 from approaching an atmospheric pressure by closing the ventilation hole 35. Further, an air can pass through between the suction chamber 35 and the sub pressure reducing chamber 33 by the gap 70 formed when the open/close unit 55 is closed. Accordingly, after leakage of air in the suction chamber 47 is eliminated, a pressure in the sub pressure reducing chamber 33 becomes equal to a pressure in the suction chamber 47 and hence, a suction force can be restored due to releasing of the ventilation hole 35 by the open/close unit 55. With such a configuration, it is possible to provide the suction traveling device 1, 1A, 1B, 1C which can maintain a stable suction force by suppressing a change in a suction force applied to the wall surface W.

The open/close unit 83 is formed of: the valve elements 58 disposed on a body side (sub pressure reducing chamber 33 side) which the endless traveling belt 20 opposedly faces, and is configured to release or close the plurality of respective ventilation holes 35 disposed communicably with the suction hole 21 disposed on a body side; and the coil spring 61 which forms the elastic member configured to bias the valve elements 58 in a direction that the ventilation holes 35 are released.

With respect to the open/close unit, besides the above-mentioned open/close unit 83, it is possible to release or close the ventilation hole 35 by an actuator or the like by detecting a pressure in the suction chamber 47 and a pressure in the pressure reducing chamber 33 using sensors. However, such an open/close unit is disposed in a large number of ventilation holes respectively and hence, a weight of the suction traveling device is increased, and also a control of the suction traveling device becomes complicated. In this embodiment, the open/close unit 55 is formed of the valve element 58 and the coil spring 61 and hence, the reduction of weight can be realized, and a complicated control becomes unnecessary by properly setting an elastic force of the coil spring 61.

The endless traveling belt 20 has a two layered structure formed of: the timing belt 45 by which a traveling drive force is transmitted; and a traveling belt 46 formed of a soft elastic body, and the traveling belt 46 is fixedly mounted on the timing belt 45 in a state where the traveling belt 46 is compressed in a length direction. Since the traveling belt 46 is formed of a porous soft elastic body and hence, the traveling belt 46 is easily compressible. With such a configuration, in the case where the wall surface W has the stepped portion 72 or the like, the traveling belt 46 is deformed following the stepped portion 72 and hence, the gap 73 is not substantially formed between the stepped portion 72 and the traveling belt 46. Accordingly, even when the suction hole 21 formed in the traveling belt 46 arrives at the stepped portion 72, leakage of air is not generated and hence, a suction force can be maintained.

According to the first to fourth embodiments described heretofore, it is possible to realize the suction traveling devices 1, 1A, 1B, 1C where a stable suction force can be maintained and, at the same time, a wall surface operation can be efficiently performed even when a wall surface, a ceiling or the like has a large area, and a working device having a large weight can be mounted on the suction traveling device 1, 1A, 1B, 1C. Further, it is possible to realize the suction traveling device 1 having a higher suction force by modifying the configuration of the endless traveling belt 20. A constitutional example where the endless traveling belt 20 of the suction traveling device 1 and a periphery of the endless traveling belt 20 according to the first embodiment described with reference to FIG. 1 to FIG. 5C are deformed is assumed as a first example of the endless traveling belt and the periphery thereof. Other constitutional examples of the suction traveling device 1 which respectively include an endless traveling belt 20A which is substantially equal to the endless traveling belt 20 in the first example of the endless traveling belt and the periphery thereof are assumed as a second example of the endless traveling belt and the periphery thereof and the third example of the endless traveling belt and the periphery thereof. The second example of the endless traveling belt and the periphery thereof and the third example of the endless traveling belt and the periphery thereof are described with reference to FIG. 9 to FIG. 12.

Figure 9:
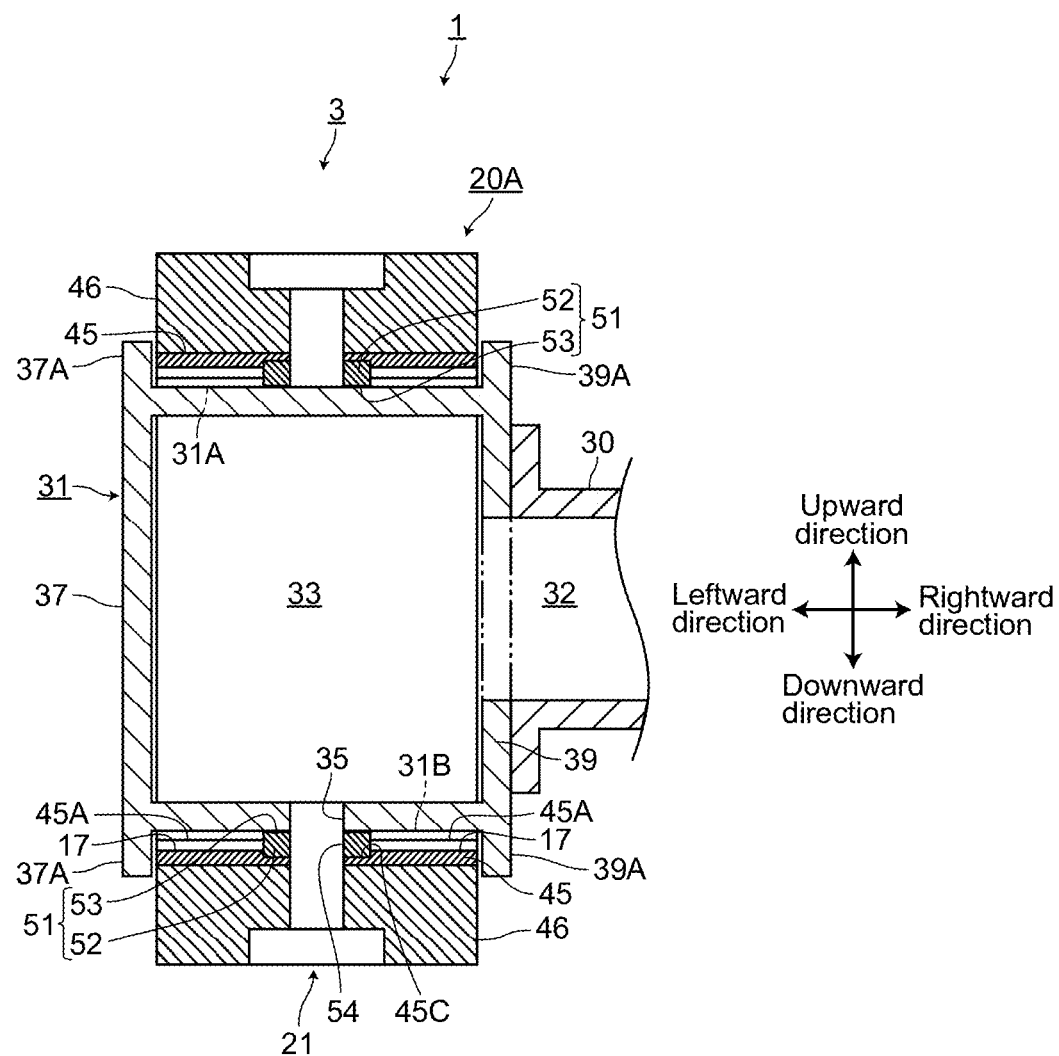
FIG. 9 is a cross-sectional view of an example of a first endless traveling belt and a periphery of the first endless traveling belt which can be used in the suction traveling devices according to the first to fourth embodiments of the present invention and other suction traveling devices, and also is a cross-sectional view showing a state where the endless traveling belt is mounted on a sub pressure reducing chamber portion 31.

FIG. 9 is a view showing the first example of the endless traveling belt and the periphery thereof. FIG. 9 is a cross-sectional view of an endless traveling belt 20A in a state where the endless traveling belt 20A is mounted on the sub pressure reducing chamber portion 31. FIG. 9 shows a cross section of the endless traveling belt 20A taken along a width direction (lateral direction). FIG. 9 shows the endless traveling belt 20A on a second drive part 3 side. The endless traveling belt 20A on a first drive part 2 side also has the same configuration and hence, the illustration of the endless traveling belt 20A on the first drive part 2 side is omitted in the drawing. Further, the endless traveling belt 20A has the same configuration over the entire circumference and hence, in FIG. 9, all constitutional elements of the endless traveling belt 20A on a lower side are described by giving symbols, while symbols are omitted with respect to some constitutional elements of the endless traveling belt 20A on an upper side.

The endless traveling belt 20A is formed of a traveling belt 46 and a timing belt 45 which is a power transmission belt. The endless traveling belt 20A has a suction band 51 which is formed by laminating a belt-like member 52 and a slide tape 53 on a side of the timing belt 45 where the timing belt 45 is brought into contact with the sub pressure reducing chamber portion 31 (referred to as an inner side). The suction belt 51 is fixedly mounted on the timing belt 45 in a state where the suction belt 51 is embedded in a groove 45C which is formed on an inner side of the timing belt 45 over the whole circumference in the traveling direction. The groove 45C is formed at an approximately center of the timing belt 45 in a width direction. On both sides of the timing belt 45 in a width direction with the suction belt 51 sandwiched therebetween, the teeth 45A which mesh with the teeth 17 of the drive wheel 14 are formed. The belt-like member 52 is made of the same soft elastic material as the traveling belt 46, and the slide tape 53 is a thin tape which is made of a material having a small friction coefficient and being excellent in sliding durability. Although not shown in the drawing, a friction between the timing belt 45 and the sub pressure reducing chamber portion 31 may be reduced by making the slide tape 53 also adhere to the upper surface 31A and the lower surface 31B of the sub pressure reducing chamber portion 31.

Holes 54 which communicate with the suction holes 21 formed in the traveling belt 46 and with the ventilation holes 35 formed in the sub pressure reducing chamber portion 31 respectively are formed at the center of the suction belt 51 in the width direction. The suction belt 51 has a thickness which allows the suction belt 51 to protrude beyond crest portions of the teeth 45A of the timing belt 45, and the slide tape 53 is brought into contact with the upper surface 31A and the lower surface 31B which form an outer shell surface of the sub pressure reducing chamber portion 31.

The outer side wall portion 37 of the sub pressure reducing chamber portion 31 has guide portions 37A which extend in the vertical direction from the upper surface 31A and the lower surface 31B respectively, and the inner side wall portion 39 has guide portions 39A which extend in the vertical direction from the upper surface 31A and the lower surface 31B respectively. The guide portions 37A, 39A are provided for preventing the endless traveling belt 20A from meandering at the time of suction traveling. The guide portions 37A, 39A may be formed on the sub pressure reducing chamber portion 31 over the whole length in the longitudinal direction, or may be formed on only a front side and a rear side of the sub pressure reducing chamber portion 31.

Figure 10:
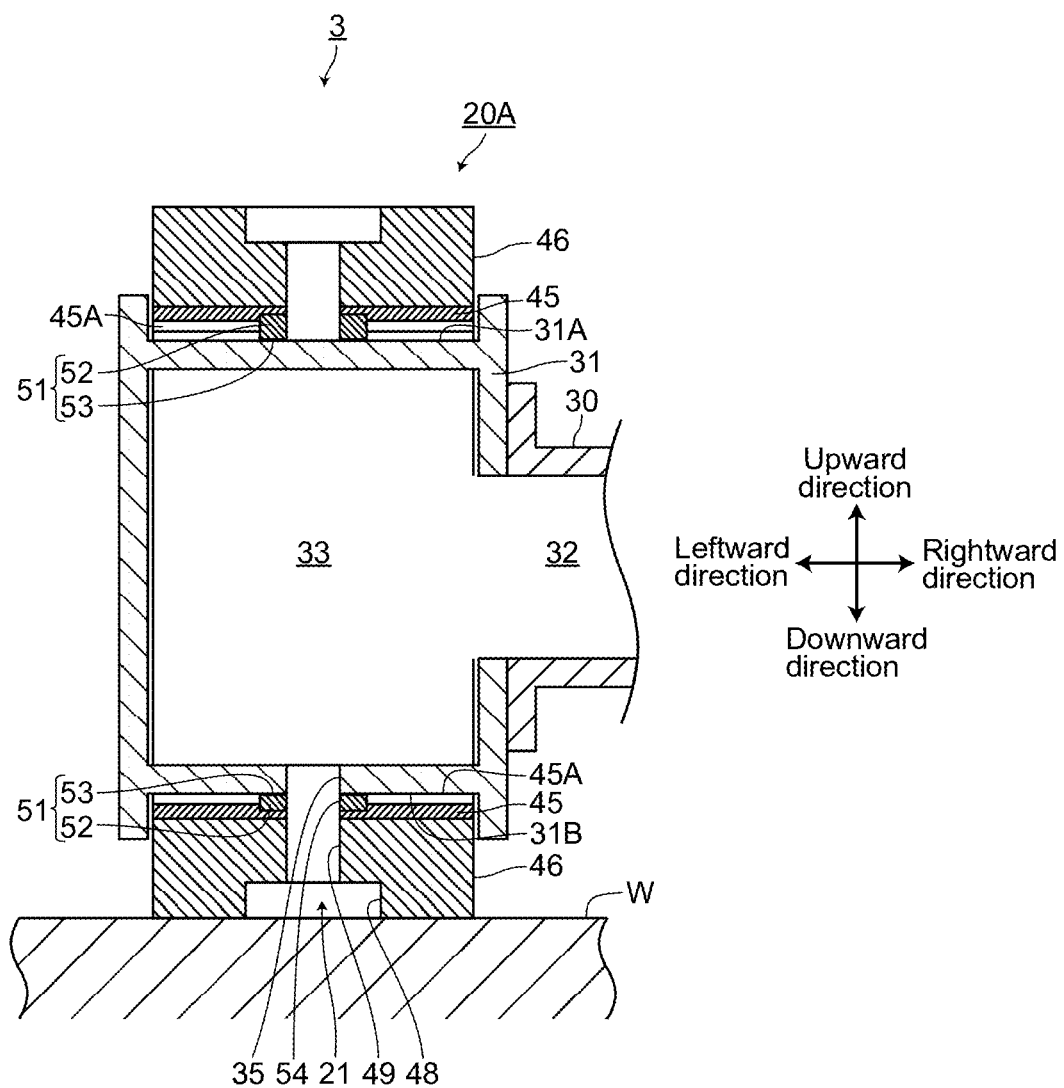
FIG. 10 is a cross-sectional view showing a state where a second drive part is adhered by suction to a wall surface which is a traveling surface in the example of the first endless traveling belt and the periphery of the first endless traveling belt.

FIG. 10 is a cross-sectional view showing a state where the second drive part 3 is adhered by suction to the wall surface W which is a traveling surface in the first example of the endless traveling belt and the periphery thereof. The first drive part 2 has the same configuration and the same manner of operation as the second drive part 3 and hence, the illustration of the first drive part 2 is omitted. By setting a pressure in the sub pressure reducing chamber 33 at a negative pressure, the endless traveling belt 20A is adhered by suction to the wall surface W. The belt-like member 52 is compressed by a suction force, and the slide tape 53 is strongly brought into close contact with the lower surface 31B of the sub pressure reducing chamber portion 31 thus eliminating leakage of air between the endless traveling belt 20A and the sub pressure reducing chamber portion 31. By eliminating leakage of air with the provision of the suction belt 51, a suction force can be further increased compared to the configuration which has no suction belt 51. It is preferable to set a thickness of the suction belt 51 such that the crest portions of the teeth 45A of the timing belt 45 are brought into contact with the lower surface 31B of the sub pressure reducing chamber 31 when the endless traveling belt 20A is adhered by suction to the wall surface W. However, a slight gap may be formed between the crest portions of the teeth 45A and the lower surface 31B of the sub pressure reducing chamber 31. A suction force does not act on an upper surface 31A side of the sub pressure reducing chamber portion 31 and hence, the suction belt 51 is brought into contact with the upper surface 31A of the sub pressure reducing chamber 31, and a gap is formed between the crest portions of the teeth 45A of the timing belt 45 and the upper surface 31A of the sub pressure reducing chamber portion 31.

In the examples shown in FIG. 9 and FIG. 10, the guide portions 37A, 39A are formed on the sub pressure reducing chamber portion 31. However, to prevent the endless traveling belt 20A from meandering, guide portions may be formed on the drive wheels 10, 14 and the driven wheels 16. Hereinafter, such a configuration is described by exemplifying the drive wheel 14.

Figure 11:
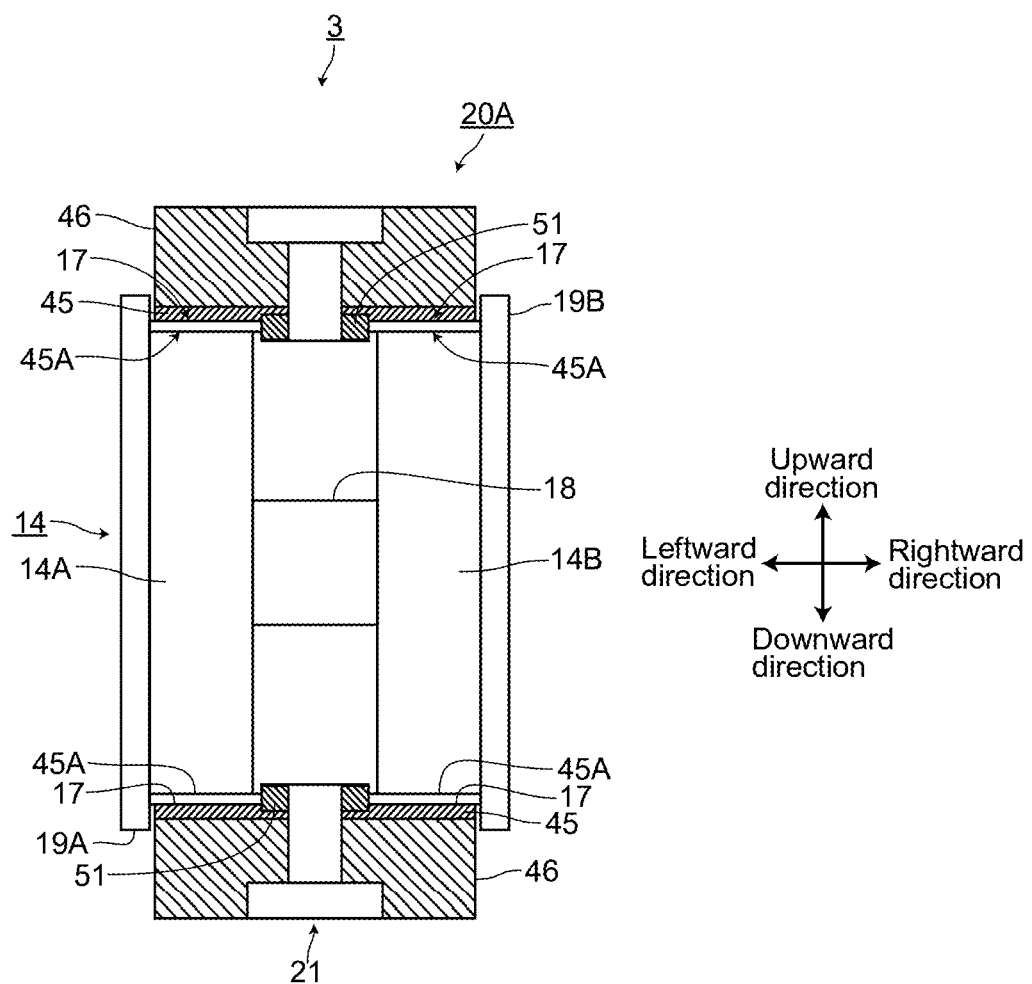
FIG. 11 is a cross-sectional view showing a relationship between the endless traveling belt and a drive wheel in an example of a second endless traveling belt and a periphery of the second endless traveling belt which can be used in the suction traveling devices according to the first to fourth embodiments of the present invention and other suction traveling devices.

FIG. 11 is a cross-sectional view showing a relationship between the endless traveling belt 20A and the drive wheel 14 in the second example of the endless traveling belt and the periphery thereof. The endless traveling belt 20A shown in FIG. 11 has the same configuration as the configurations described with reference to FIG. 9 and FIG. 10 and hence, the description of the detailed configuration of the endless traveling belt 20A is omitted. The suction belt 51 is fixedly mounted on the endless traveling belt 20A at the center in the width direction. The drive wheel 14 is divided into drive wheel parts 14A, 14B with the suction belt 51 sandwiched between the drive wheel parts 14A, 14B. The drive wheel parts 14A, 14B are connected to each other by a shaft 18. The teeth 17 are formed on outer peripheral portions of the drive wheel parts 14A, 14B respectively, and the teeth 17 mesh with the teeth 45A of the timing belt 45. The endless traveling belt 20A has the suction belt 51 and hence, the drive wheel 14 is divided into the drive wheel part 14A and the drive wheel part 14B so as to prevent the teeth 17 from interfering with the suction belt 51.

The drive wheel part 14A has a guide portion 19A which is formed by increasing a diameter of a left side end surface of the drive wheel part 14A to the position where the left side end surface intersects with the thickness direction of the endless traveling belt 20A, and the drive wheel 14B has a guide portion 19B which is formed by increasing a diameter of aright side end surface of the drive wheel 14B to the position where the right side end surface intersects with the thickness direction of the endless traveling belt 20A. The guide portions 19A, 19B are provided for preventing the endless traveling belt 20A from meandering at the time of suction traveling. The guide portions 19A, 19B are also provided to the drive wheel 10 and the driven wheels 16 in the same manner.

The formation of the guide portions 37A, 39A on the sub pressure reducing chamber 31 and the formation of the guide portions 19A, 19B on the drive wheels 10, 14 and the driven wheel 16 are also applicable to the previously-mentioned first embodiment (see FIG. 1 and FIG. 2). Further, the suction traveling device 1 may be configured to include both the guide portions 37A, 39A and the guide portions 19A, 19B, or the suction traveling device 1 may be configured to include either one of the guide portions 37A, 39A or the guide portions 19A, 19B. One or both of the configuration where the drive wheel portion is divided into the drive wheel parts and the configuration where the guide portions are formed can be used in the suction traveling devices according to the first to fourth embodiments and other suction traveling devices.

According to the suction traveling devices 1 according to the first and second examples of the endless traveling belt and the periphery thereof described above, the endless traveling belt 20A further includes the suction belt 51 which is formed by laminating the belt-like member 52 which is a soft elastic body and the slide tape 53 on a sub pressure reducing chamber 31 side (sub pressure reducing chamber portion 33 side) of the timing belt 45 which is a power transmission belt. The suction belt 51 is fixed to the center portion of the endless traveling belt 20A in the width direction. The suction belt 51 has holes 54 which are communicable with the ventilation holes 35 and the suction holes 21. The slide tape 53 is disposed such that the slide tape 53 slides in a close contact state on the lower surface 31B which is an outer shell surface of the sub pressure reducing chamber portion 33 on a traveling surface side when the suction traveling device 1 travels on the wall surface W which is a traveling surface while adhering to the wall surface W by suction.

With such a configuration, when the suction traveling device 1 travels while adhering to the wall surface W by suction, the suction belt 51 is brought into close contact with the peripheries of the ventilation holes 35 formed in the lower surface 31B of the sub pressure reducing chamber portion 31. Accordingly, it is possible to suppress the occurrence of leakage of air between the endless traveling belt 20A and the sub pressure reducing chamber portion 31 thus realizing the suction traveling device 1 having a higher suction force.

Although not shown in the drawing, the configuration may be adopted where the suction belt 51 can be mounted on the lower surface 31B of the sub pressure reducing chamber portion 31. For example, at the arrangement position of the suction belt 51 shown in FIG. 9, the suction belt 51 is fixedly mounted on the lower surface 31B of the sub pressure reducing chamber portion 33. A groove corresponding to the groove 45C shown in FIG. 9 is formed on the timing belt 45, and the suction belt 51 is made to pass through the groove. The suction belt 51 is configured such that the belt-like member 52 is fixedly mounted on a sub pressure reducing chamber portion 31 side, and the slide tape 53 is made to slide on a groove bottom surface of the timing belt 45. Such a configuration also can acquire the same advantageous effects as the previously-mentioned configuration where the endless traveling belt 20A includes the suction belt 51. With such a configuration, it is unnecessary to divide the drive wheel 14 into the drive wheel parts 14A, 14B. The same goes for the case of the drive wheel 10 and the case of the driven wheels 16 as the case of the drive wheel 14.

When a suction force of the endless traveling belt 20A applied to the wall surface W is increased, a friction load between the endless traveling belt 20A and the sub pressure reducing chamber portion 31 during suction traveling is increased and hence, there is a concern that a traveling loss is generated. In view of the above, the configuration which can reduce such a friction load is described with reference to FIG. 12 as a third example.

Figure 12:
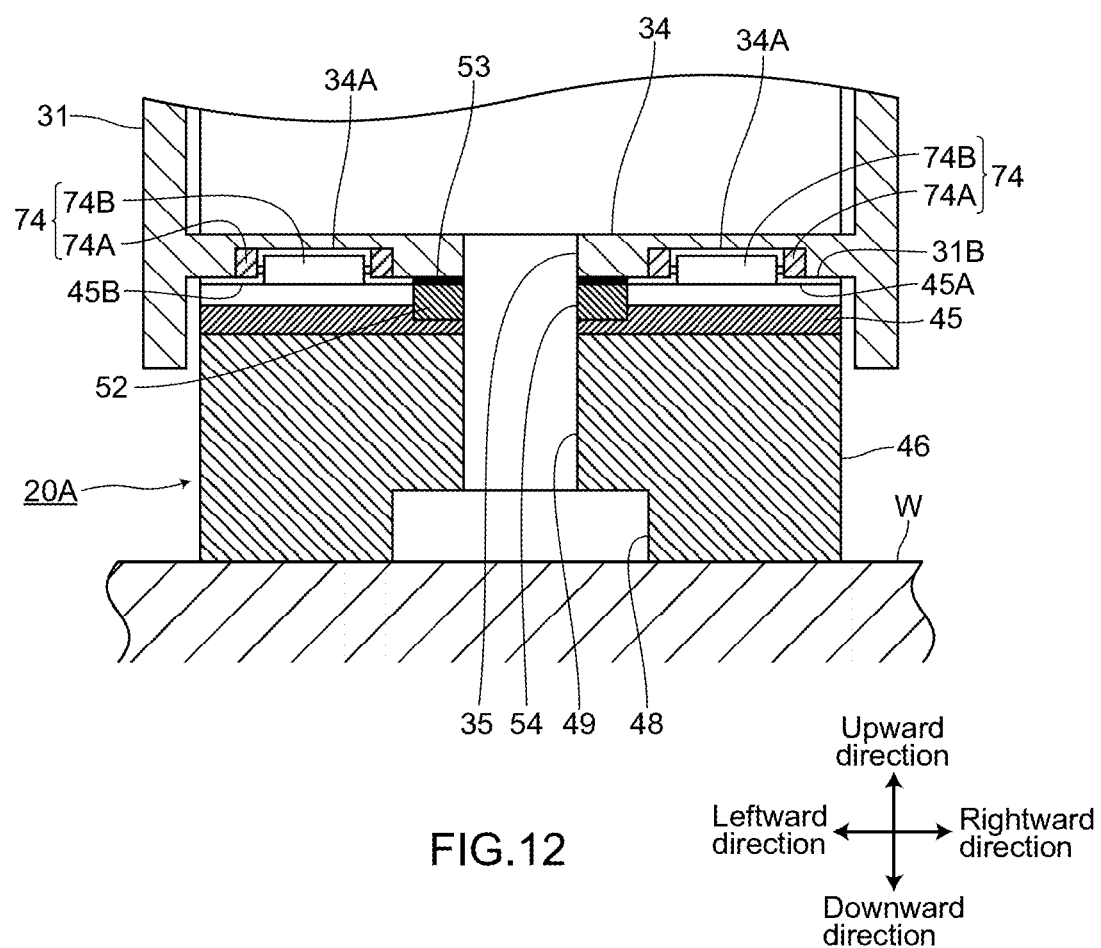
FIG. 12 is a partial cross-sectional view showing the configuration of a sub pressure reducing chamber portion in an enlarged manner in an example of a third endless traveling belt and a periphery of the third endless traveling belt which can be used in the suction traveling devices according to the first to fourth embodiments of the present invention and other suction traveling devices.

FIG. 12 is a partial cross-sectional view showing the configuration of the sub pressure reducing chamber portion 31 in an enlarged manner in the third example of the endless traveling belt and the periphery thereof. An endless traveling belt 20A has substantially the same configuration as the endless traveling belt 20A in the previously-mentioned second example. Roller units 74 are embedded in an endless traveling belt 20A side of the bottom portion 34 of the sub pressure reducing chamber portion 31. Each roller unit 74 includes: a roller frame body 74A; and a plurality of rollers 74B which are rotatably and pivotally supported on the roller frame body 74A. The roller unit 74 is arranged on both sides of the suction belt 51 in the width direction such that the roller units 74 sandwich the suction belt 51 therebetween. The roller units 74 are arranged along the length direction (longitudinal direction) of the sub pressure reducing chamber portion 31. Each roller unit 74 is embedded in a recessed portion 34A formed on the bottom portion 34 of the sub pressure reducing chamber portion 31. A portion of an outer peripheral surface of the roller 74B protrudes from the lower surface 31B of the sub pressure reducing chamber portion 31. A large number of the rollers 74B are arranged in a row in the traveling direction. Accordingly, when the suction traveling device 1 is adhered to the wall surface W by suction and the suction belt 51 is compressed, the rollers 74B are brought into contact with crest portions of the teeth 45A of the timing belt 45. The rollers 74B are disposed such that the rollers 74B are rolled by the timing belt 45 when the suction traveling device 1 travels while adhering to the wall surface W by suction.

According to the third example of the endless traveling belt and the periphery thereof, the rollers 74B are disposed between the sub pressure reducing chamber portion 31 and the endless traveling belt 20A. Accordingly, although a friction load is liable to be increased due to an increase of a suction force brought about by the provision of the suction belt 51, such a friction can be reduced with the provision of the rollers 74B and hence, it is possible to reduce a traveling loss.

In the example shown in FIG. 12, the configuration is illustrated where the roller units 74 are disposed on a lower surface 31B side of the sub pressure reducing chamber portion 31. The roller units 74 may be disposed also on an upper surface 31B side of the sub pressure reducing chamber portion 31 in addition to the roller units 74 disposed on the lower surface 31B side. With such a configuration, a friction resistance generated between the sub pressure reducing chamber portion 31 and the endless traveling belt 20 can be further reduced when the suction traveling device 1 travels. In FIG. 12, the configuration where the suction belt 51 is provided is illustrated. The roller units 74 are also applicable to the configuration where the suction traveling device 1 does not include the suction belt 51.

In the suction traveling device 1 according to the previously-mentioned first embodiment, a negative pressure is generated between the suction traveling device 1 and the wall surface W from the sub pressure reducing chamber 33 by the blower unit 5 by way of the main pressure reducing chamber 32. However, although not shown in the drawing, the suction traveling device 1 may be configured such that the blower unit 5 directly sucks the wall surface W from the sub pressure reducing chamber 33 by way of a pipe without by way of the main pressure reducing chamber 32. In this case, a suction force can be further increased by decreasing a capacity of the sub pressure reducing chamber 33. The sub pressure reducing chamber portion 31 supports the endless traveling belt 20, 20A and hence, for example, it is sufficient that members for supporting the endless traveling belt 20, 20A be mounted on the sub pressure reducing chamber portion 31.

Although not shown in the drawing, the suction traveling device 1 may be configured such that a pressure reducing chamber portion having a small capacity (referred to as a second pressure reducing chamber portion) is further housed in the conventional sub pressure reducing chamber portion 31, and the suction traveling device 1 may be configured such that the blower unit 5 directly sucks the wall surface W using the blower unit 5 by way of a pipe. Ventilation holes which communicate with the ventilation holes 35 formed in the sub pressure reducing chamber portion 31 are formed in the second pressure reducing chamber portion, and the second pressure reducing chamber portion is fixed to the sub pressure reducing chamber portion 31. In such a configuration, the sub pressure reducing chamber portion 31 functions as a support body for supporting the endless traveling belt 20, 20A.

Figure 13:
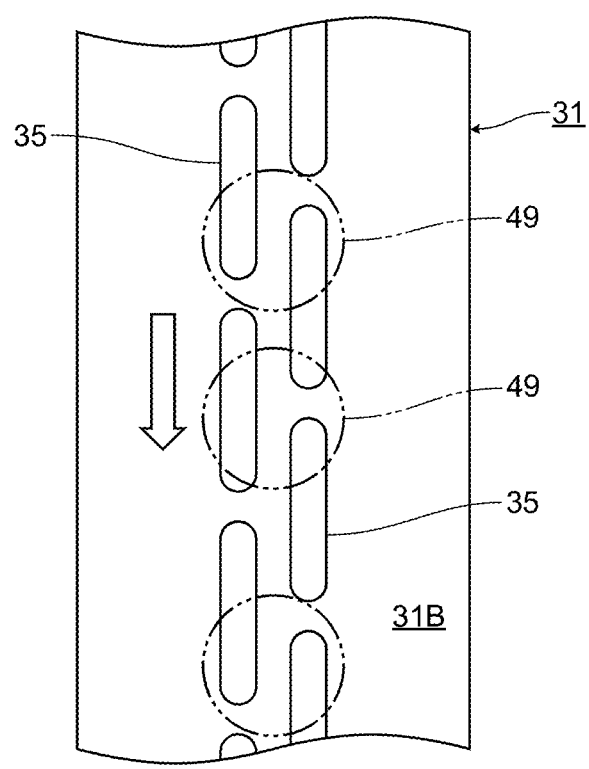
FIG. 13 is an explanatory view schematically showing the arrangement of ventilation holes formed in the sub pressure reducing chamber portion.

FIG. 13 is an explanatory view schematically showing one example of the arrangement of the ventilation holes 35 formed in the sub pressure reducing chamber portion 31 of the suction traveling device 1 according to the first embodiment. The endless traveling belt 20, 20A moves along the sub pressure reducing chamber portion 31 in a direction indicated by an arrow in the drawing during when the suction traveling device 1 travels by being adhered to the wall surface W by suction. That is, the penetration holes 49 which form the suction holes 21 also move. The penetration holes 49 should always communicate with the ventilation holes 35. In view of the above, as shown in FIG. 13, the ventilation holes 49 are respectively formed of an elongated hole, and the ventilation holes 49 are arranged in two rows in a staggered manner at pitches displaced from each other. With such a configuration, the penetration holes 49 can communicate with the ventilation holes 35 at any positions. The ventilation holes 35 may be formed in a rectangular shape. The ventilation holes 35 may be arranged in three rows. That is, the shape and the arrangement of the ventilation holes 35 can be set as desired. Further, even when the ventilation holes 35 have a circular shape or are arranged in one row, provided that a pitch of the ventilation holes 35 is suitably displaced from a pitch of the penetration holes 49, the ventilation holes 35 and the penetration holes 49 never fail to communicate with each other at any positions. The configuration where the pitch of the ventilation holes 35 is displaced from the pitch of the penetration holes 49 is applicable to the suction traveling devices according to the first to fourth embodiments and other suction traveling devices.

The present invention is not limited to the suction traveling devices according to the embodiments and the examples of the endless traveling belt and the periphery thereof which have been described heretofore. The present invention also includes modifications, improvements and the like within a scope where the object of the present invention can be achieved. For example, a sensor which detects a state of the wall surface W and a computer may be mounted on the suction traveling device 1 according to the embodiments of the present invention, and the suction traveling device 1 may travel by itself on the wall surface W in accordance with a program set by the computer. Alternatively, a communication device may be mounted on the suction traveling device 1, and traveling of the suction traveling device 1 may be controlled by wire or wireless. Further, a hook or the like may be mounted on the suction traveling device 1, and a cable for preventing falling of the suction traveling device 1 may be made to engage with the hook.

In the embodiments which have been described heretofore, a compression ratio of the traveling belt 46 in a length direction is set to a value which falls within a range of from 50% to 80% inclusive. However, when operability of a work is taken into account, the compression ratio may be set to a value which falls within a range of from 80% to 95% inclusive, preferably within a range of from 40% to 95% inclusive, more preferably within a range of from 50% to 95% inclusive, and most preferably within a range of from 60% to 80% inclusive.

In the embodiments which have been described heretofore, the respective suction traveling devices 1 (1A) are connected to each other by the connecting plates 84 and the hinges 85. However, the plurality of suction traveling devices 1 (1A) may be connected to each other by one mounting frame 75, or the connecting plate 84 may be mounted by making use of the drive wheel support plates 38, 40 and the driven wheel support plates 41, 42 without providing the mounting frame 75.

In the embodiments which have been described heretofore, an object to which the suction traveling device 1 is applicable is the wall surface W which is vertical or is steeply inclined. However, the present invention is applicable to all other surfaces such as, for example, a ceiling surface or a horizontal surface of a dangerous suspension bridge which a person crosses. Further, in the embodiments which have been described heretofore, the suction traveling device which includes the main pressure reducing chamber and the sub pressure reducing chambers is described. However, the number of pressure reducing chambers may be one or three or more. Further, the partial configurations and constitutional parts of the suction traveling devices 1, 1A, 1B, 1C according to the first to fourth embodiments and the first to third examples of the endless traveling belt and the periphery thereof are suitably applicable with modification to other embodiments and the like and, further, are also used (applicable) with modification to other suction traveling devices.

In the embodiments which have been described heretofore, the suction holes 21, the ventilation holes 35, the suction chambers 47, the suction recessed portions 48, and the penetration holes 49 are formed in a rectangular parallelepiped shape having a quadrangular planar shape. However, these constitutional elements may be respectively formed of a three-dimensional space having a different planar shape such as an elliptical shape, a spherical shape or a triangular shape. In the embodiments which have been described heretofore, the suction traveling device includes two drive parts (the first drive part 2 and the second drive part 3). However, the suction traveling device may include one drive part or three or more drive parts.

In the embodiments which have been described heretofore, the timing belt 45 is used as the power transmission belt. However, as the power transmission belt, a belt having a flat surface where no unevenness (teeth) is formed may be used. In this case, as the drive wheels 10, 14 and the driven wheels 16, 16, a toothed wheel having unevenness (teeth) may be used, or a friction wheel having no unevenness (no teeth) may be used.

The invention claimed is:

1. A suction traveling device configured for traveling on a traveling surface while adhering to the traveling surface by suction, the suction traveling device comprising:
   a first drive part and a second drive part each having an endless traveling belt in which a plurality of suction holes are formed;
   a main pressure reducing chamber where a pressure is reduced by an air suction device, and sub pressure reducing chambers each communicating with the main pressure reducing chamber and disposed in the first drive part and the second drive part;
   a plurality of ventilation holes formed in each of the sub pressure reducing chambers, the plurality of ventilation holes being disposed on a side of the sub pressure reducing chamber where the suction holes are disposed, the plurality of ventilation holes provided for making the sub pressure reducing chambers and the plurality of respective suction holes communicate with each other; and
   an open/close unit for releasing or closing the respective ventilation holes, wherein
   for each of the sub pressure reducing chambers,
      the open/close unit is configured to release the ventilation holes when a pressure in a plurality of suction chambers formed by the traveling surface and the suction holes is equal to a pressure in the sub pressure reducing chamber,
      the open/close unit is configured to close the ventilation holes when the pressure in the suction chambers is higher than the pressure in the sub pressure reducing chamber, and
      each suction chamber among the plurality of suction chambers has a corresponding ventilation hole among the plurality of ventilation holes, and the corresponding ventilation hole, when closed, has a gap sized to prevent the pressure in the sub pressure reducing chamber from affecting the pressure in other suction chambers among the plurality of suction chambers.

2. The suction traveling device according to claim 1, wherein an opening area of each of the plurality of suction holes on a sub pressure reducing chamber side is smaller than an opening area of the suction hole on a traveling surface side.

3. The suction traveling device according to claim 2, further comprising a mounting member which is fixed to a bottom portion of the main pressure reducing chamber on the traveling surface side, wherein
 a portion of the mounting member has a frame portion which is formed in a projecting manner, the frame portion being provided for mounting an operation device outside the first drive part and the second drive part.

4. A plurality of suction traveling devices according to claim 3, wherein the plurality of the suction traveling devices are connected to each other by the mounting member fixed to the main pressure reducing chamber of each of the plurality of suction traveling devices and a connecting unit in a traveling direction and/or in a direction orthogonal to the traveling direction.

5. The plurality of suction traveling devices according to claim 4, wherein the connecting unit has:
 a connecting plate which is disposed between the mounting members of the suction traveling devices disposed adjacently to each other; and
 a hinge which connects the mounting members and the connecting plate to each other.

6. The suction traveling device according to claim 1, wherein each open/close unit comprises:
 a valve element disposed on a body side which the endless traveling belt oppositely faces, and configured to release or close one of the respective ventilation holes disposed communicably with the suction holes disposed on the body side; and
 an elastic member configured to bias the valve element in a direction that the ventilation holes are released.

7. The suction traveling device according to claim 1, wherein the endless traveling belt of at least one of the first drive part or the second drive part has a two layer structure comprising:
 a power transmission belt by which a traveling drive force is transmitted; and
 a traveling belt of an elastic body, wherein the traveling belt is fixedly mounted on the power transmission belt in a state where the traveling belt is compressed in a length direction.

8. The suction traveling device according to claim 7, wherein
 the endless traveling belt of at least one of the first drive part or the second drive part further includes a suction belt being a laminate of a belt member of an elastic body and a slide tape on a sub pressure reducing chamber side of the power transmission belt,
 the suction belt is fixed to a center portion of the endless traveling belt in a width direction, the suction belt having holes which are communicable with the ventilation holes and the suction holes, and
 the slide tape is disposed so as to slide while being in close contact with an outer shell surface of the sub pressure reducing chamber on a traveling surface side in a state where the suction traveling device travels on the traveling surface while adhering to the traveling surface by suction.

9. The suction traveling device according to claim 8, wherein
 a plurality of rollers where a portion of an outer peripheral surface of each roller protrudes from the outer shell surface are arranged on the outer shell surface on both sides of the suction belt in the width direction such that the rollers sandwich the suction belt, and are disposed in a longitudinal direction of the outer shell surface, and
 the rollers are disposed so as to roll by the power transmission belt when the suction traveling device travels on the traveling surface while adhering to the traveling surface by suction.

10. A suction traveling device comprising:
an endless traveling belt in which a plurality of suction holes are formed; and
an air suction device for sucking air on a suction hole side,
 wherein the suction traveling device is configured to perform at least one of moving forward or moving backward due to rotation of the endless traveling belt in a state where a posture of the endless traveling belt is maintained while adhering to a traveling surface by suction, wherein
 the suction traveling device further comprises an open/close unit configured
  (1) for transmitting a reduction of a pressure generated by the air suction device to the suction hole side when the suction hole side does not communicate with an external space, and
  (2) for not transmitting the reduction of the pressure to the suction hole side when the suction hole side communicates with the external space, and
 the open/close unit is configured to
  be in an opened state to reduce a pressure in the suction hole, when the suction hole side does not communicate with the external space, and
  be in a closed state while still forming a gap at the suction hole, when the suction hole side communicates with the external space and a pressure on the suction hole side is an atmospheric pressure,
 wherein the gap is configured for allowing the pressure on the suction hole side to be reduced even during the closed state of the open/close unit, when a non-communication state in which the suction hole side does not communicate with the external space is restored.

11. The suction traveling device according to claim 10, wherein
 each open/close unit comprises:
  at least one pad disposed on a periphery of the suction hole, and
  a valve element, and
 the gap is formed by the at least one pad in the closed state of the open/close unit when the valve element closes the suction hole.

* * * * *